United States Patent
Ren et al.

(10) Patent No.: US 11,528,966 B2
(45) Date of Patent: Dec. 20, 2022

(54) MOLDED SURFACE FASTENER AND MANUFACTURING METHOD OF MOLDED SURFACE FASTENER

(71) Applicant: YKK Corporation, Tokyo (JP)

(72) Inventors: Zhiyu Ren, Kurobe (JP); Takayuki Matsui, Kurobe (JP); Yohei Koyama, Kurobe (JP); Jun Hashizume, Kurobe (JP)

(73) Assignee: YKK Corporation, Tokyo (JP)

( * ) Notice: Subject to any disclaimer, the term of this patent is extended or adjusted under 35 U.S.C. 154(b) by 253 days.

(21) Appl. No.: 16/963,744

(22) PCT Filed: Feb. 13, 2018

(86) PCT No.: PCT/JP2018/004843
§ 371 (c)(1),
(2) Date: Jul. 21, 2020

(87) PCT Pub. No.: WO2019/159223
PCT Pub. Date: Aug. 22, 2019

(65) Prior Publication Data
US 2021/0093053 A1 Apr. 1, 2021

(51) Int. Cl.
*A44B 13/00* (2006.01)
*A44B 18/00* (2006.01)

(52) U.S. Cl.
CPC ...... *A44B 13/0023* (2013.01); *A44B 18/0049* (2013.01); *A44D 2203/00* (2013.01)

(58) Field of Classification Search
CPC ............ A44B 13/0023; A44B 18/0049; A44B 18/0061; A44B 18/0076; A44B 18/00;
(Continued)

(56) References Cited

U.S. PATENT DOCUMENTS 9,433,262 B2 * 9/2016 Okuda ............... A44B 18/0015
9,445,650 B2 * 9/2016 Murasaki ............. B29C 43/222
(Continued)

FOREIGN PATENT DOCUMENTS

CN 106343665 A 1/2017
CN 107529857 A 1/2018
(Continued)

OTHER PUBLICATIONS

Office Action, Japanese Patent Application No. 2019-571834, dated Dec. 21, 2021, 6 pages.
(Continued)

*Primary Examiner* — Robert Sandy
*Assistant Examiner* — Louis A Mercado
(74) *Attorney, Agent, or Firm* — Kilpatrick Townsend & Stockton LLP

(57) ABSTRACT

This molded surface fastener includes: a base portion; right and left outer wall portions arranged on the upper surfaces of the base portion; a plurality of engaging elements arranged between the right and left outer wall portions; and right and left magnetic wall portions arranged between the outer wall portions and the engaging elements. This molded surface fastener is molded by melting and integrating first synthetic resin and second synthetic resin that contains magnetic particles. At least each upper end part of the outer wall portions is formed only of the first synthetic resin, while at least each upper end part of the magnetic wall portions is formed only of the second synthetic resin. Consequently, the right and left magnetic wall portions can be formed into predetermined shapes in a stable manner.

11 Claims, 10 Drawing Sheets

(58) Field of Classification Search
CPC .. A44D 2203/00; B29C 43/222; B29C 43/24; B29C 44/14; B29K 2105/16; B29K 2995/0008
See application file for complete search history.

(56) References Cited

U.S. PATENT DOCUMENTS

| | | | |
|---|---|---|---|
| 9,504,296 B2* | 11/2016 | Cina | A44B 18/0076 |
| 9,826,801 B2* | 11/2017 | Mascarenhas | A44B 18/0076 |
| 9,918,526 B2* | 3/2018 | Mascarenhas | A44B 18/0076 |
| 9,936,773 B2* | 4/2018 | Okuda | A44B 18/0076 |
| 10,051,926 B2* | 8/2018 | Smith | F16B 1/00 |
| 10,064,453 B2* | 9/2018 | Mizumoto | A44B 18/0076 |
| 10,258,113 B2* | 4/2019 | Imai | B60N 2/5833 |
| 10,327,518 B2* | 6/2019 | Imai | A44B 18/0061 |
| 10,524,547 B2* | 1/2020 | Okuda | A44B 18/0076 |
| 10,548,374 B2* | 2/2020 | Ren | A44B 18/0049 |
| 11,051,590 B2* | 7/2021 | Abe | A44B 18/0049 |
| 2016/0316860 A1 | 11/2016 | Cina et al. | |
| 2017/0013918 A1 | 1/2017 | Ren et al. | |
| 2017/0013919 A1 | 1/2017 | Ren et al. | |
| 2020/0121034 A1 | 4/2020 | Ren et al. | |

FOREIGN PATENT DOCUMENTS

| | | |
|---|---|---|
| JP | 2017-023724 A | 2/2017 |
| WO | 2017/141436 A1 | 8/2017 |

OTHER PUBLICATIONS

International Search Report, PCT Application No. PCT/JP2018/004843, dated May 15, 2018.
Office Action, Japanese Patent Application No. 2019-571834, dated May 25, 2021.
Office Action, Korean Patent Application No. 10-2020-7021005, dated Dec. 20, 2021, 8 pages.
Office Action, Chinese Patent Application No. 201880088170.6, dated Aug. 16, 2022, 15 pages.

* cited by examiner

MOLDED SURFACE FASTENER AND MANUFACTURING METHOD OF MOLDED SURFACE FASTENER

TECHNICAL FIELD

The invention relates to a molded surface fastener in which a plurality of engaging elements stand on a thin plate-shaped base portion, and a method for manufacturing the molded surface fastener.

BACKGROUND ART

Passenger seats of automobiles or trains, various kinds of sofas, office chairs and the like are often formed by attaching a skin material such as fiber fabric or natural or synthetic leather to a surface of a cushion body (foam body) molded in a predetermined shape by using a foam resin material. The cushion body used in these various kinds of seats often has a curved surface composed of convex-concave shapes satisfying human engineering factors in order to maintain a seating posture which provides no fatigue despite long-hour seating.

Moreover, when the skin material is attached to the surface of a cushion body, a method is usually employed that after the cushion body is molded in a desired shape, the skin material covers the surface of the obtained cushion body and is fixed. In this case in particular, a molded surface fastener having a plurality of hook-shaped engaging elements is generally used as means for fixing the surface of the cushion body and a back surface of the skin material.

A molded surface fastener has a configuration in which a plurality of male engaging elements are disposed on one surface of a base portion made of thermoplastic resin. Such a molded surface fastener is attached to a cavity surface of a molding die, and a cushion body is foam-molded using the molding die on which the molded surface fastener is attached. Thereby, the molded surface fastener is integrated to a surface of the molded cushion body so that the engaging elements are exposed. Meanwhile, on a back surface of a skin material which covers the cushion body, a plurality of loop-shaped female engaging elements which can be engaged with the engaging elements of the molded surface fastener are provided.

After the skin material covers on the cushion body to which the molded surface fastener is integrated, the loop-shaped engaging elements disposed on the back surface of the skin material are pressed against the molded surface fastener disposed on the surface of the cushion body, thereby the loop-shaped engaging elements of the skin material are engaged with the hook-shaped engaging elements of the molded surface fastener, and the skin material is fastened to the molded surface fastener. In this manner, the skin material is easily fixed to the surface of the cushion body along the convex-concave shapes of the surface, and the skin material is prevented from floating from the cushion body.

Meanwhile, a magnetic force is used as a means of attaching a molded surface fastener to a cavity surface of a molding die at the time of foam molding of a cushion body. For example, it has been conventionally operated that a magnet is buried in a fastener attaching surface of a molding die while a magnetic material which is magnetically attracted to the magnet of the molding die is attached, or the magnetic material is contained partially in the molded surface fastener.

Means for attaching a magnetic material to a molded surface fastener include fixing a monofilament containing the magnetic material to a base portion of the molded surface fastener, laminating films containing the magnetic material on the base portion of the molded surface fastener, or applying the magnetic material to the base portion in a plate shape of the molded surface fastener.

Further, in a case of containing the magnetic material partially in the molded surface fastener, a method of manufacturing the molded surface fastener by performing a two-color molding using a synthetic resin material containing the magnetic material (magnetic particles) and a synthetic resin material not containing the magnetic material, for example, is generally employed. An example of the molded surface fastener which is manufactured by such a two-color molding is described in WO2017/141436 (Patent Document 1). The molded surface fastener described in Patent Document 1 is shown in FIG. 16. In FIG. 16, a part which contains the magnetic particles is represented in a gray color in the molded surface fastener.

A molded surface fastener 100 in Patent Document 1 has a base portion 101 (also referred to as base material portion) in a thin plate shape, right and left resin-intrusion-preventing wall portions 102 disposed along a length direction at right and left side edge parts of the base portion 101, a plurality of engaging elements 103 in a hook shape disposed between the right and left resin-intrusion-preventing wall portions 102, a lateral wall portion 104 disposed along a right and left direction, and a fin piece portion 105 extending outward in the width direction from the right and left side edges of the base portion 101.

The right and left resin-intrusion-preventing wall portions 102 in Patent Document 1 has a first vertical wall row 111 formed on an inner side in a width direction (near a center part of the base portion 101), a second vertical wall row 112 formed on an outer side in the width direction (near the right and left side edge parts of the base portion 101), and a connecting wall portion 113 connecting the first vertical wall row 111 and the second vertical wall row 112.

The first vertical wall row 111 and the second vertical wall row 112 have a plurality of divided vertical wall portions 115 disposed intermittently at constant pitches. In this case, the divided vertical wall portion 115 of the first vertical wall row 111 and the divided vertical wall portion 115 of the second vertical wall row 112 are arranged in a staggered shape that the installed positions are shifted in the length direction to be alternately disposed.

The connected wall portion 113 of the resin-intrusion-preventing wall portion 102 connects a front end part (or a rear end part) of the divided vertical wall portion 115 disposed on the first vertical wall row 111 and a rear end part (or a front end part) of the divided vertical wall portion 115 disposed on the second vertical wall portion 112 each other. In this case, the divided vertical wall portion 115 disposed on the first vertical wall row 111 is connected via two connected wall portions 113 with two divided vertical wall portions 115 disposed on an adjacent second vertical wall row 112.

A height dimension of each connected wall portion 113 from an upper surface of the base portion 101 is as the same as the divided vertical wall portions 115 of the first vertical wall row 111 and the second vertical wall row 112. Therefore, each of the right and left resin-intrusion-preventing wall portions 102 is formed continuously to meander in a zig-zag shape with a constant height dimension with the divided vertical wall portion 115 of the first vertical wall row 111, the connected wall portion 113, and the divided vertical wall portion 115 of the second vertical wall row 112.

In the molded surface fastener 100 of Patent Document 1, magnetic particles are contained in each of the right and left resin-intrusion-preventing wall portions 102. The magnetic particles are substantially not contained in the base portion 101, the engaging element 103 and the lateral wall portion 104. In each resin-intrusion-preventing wall portion 102, a concentration gradient portion in which a concentration of the magnetic particles is reduced as being extended downward is formed.

In such a molded surface fastener 100 in Patent Document 1, the magnetic particles attracted to the magnet are contained in the right and left resin-intrusion-preventing wall portions 102, thereby when the magnet is buried under a fastener attaching surface of a molding die, and when the molded surface fastener 100 is moved closer to the fastener attaching surface of the molding die, the molded surface fastener 100 is magnetically attracted and fixed to the fastener attaching surface in a direction that the engaging elements 103 face to the fastener attaching surface.

At this time, the right and left resin-intrusion-preventing wall portions 102 are adhered to the molding die, thereby an engaging area on which a plurality of engaging elements 103 disposed inside the right and left resin-intrusion-preventing wall portions 102 are provided and an area outside the right and left resin-intrusion-preventing wall portion 102 can be divided. Therefore, when foam molding of a cushion body is performed, a foam resin material can be prevented from intruding from the outside area of the resin-intrusion-preventing wall portion 102 into the engaging area over the resin-intrusion-preventing wall portion 102. As a result, the cushion body on which the molded surface fastener 100 is integrated on a top surface as well as a plurality of engaging elements 103 of the molded surface fastener 100 are exposed can be stably manufactured.

In the molded surface fastener 100 of Patent Document 1, the concentration gradient portion of the magnetic particles as mentioned above is provided on the resin-intrusion-preventing wall portion 102. Thereby, a boundary part between a part containing the magnetic particles and a part of synthetic resin only without magnetic particles is less likely to be formed clearly.

As a result, adhesion between the part containing the magnetic particles and the part not containing the magnetic particles in the molded surface fastener 100 can be improved. Thereby, in the molding process of the molded surface fastener 100, for example, the molded surface fastener 100 can be less likely to be cracked or torn, and production efficiency and yields of the molded surface fastener 100 can be improved.

On the other hand, when magnetic particles are contained in synthetic resin, flexibility of the synthetic resin is generally lowered. Further, there is a tendency that the more the amount of the magnetic particles is, the lower the flexibility of the synthetic resin is. Therefore, in the molded surface fastener 100 of Patent Document 1, the above-mentioned concentration gradient portion of the magnetic particles is provided at the resin-intrusion-preventing wall portion 102 to reduce the used amount of the magnetic particles. At the same time, by securing a dimension in the fastener width direction (hereinafter, abbreviated to the width dimension) of the connected wall portion 113 in the resin-intrusion-preventing wall portion 102, the connected wall portion 113 is formed to be easy to elastically deform. Thus, the molded surface fastener 100 of Patent Document 1 can be stably provided with appropriate flexibility.

PRIOR ART DOCUMENTS

Patent Documents

Patent Document 1: WO2017/141436

SUMMARY OF INVENTION

Problems to be Solved by the Invention

In the molding die used for foam molding of a cushion body, a magnet is buried in a fastener attaching surface in order to attach a molded surface fastener to a cavity surface of the molding die, as mentioned above. Recently, the magnet to be provided on the fastener attaching surface of the molding die is formed to have a small width dimension in some cases in view of cost effectiveness and so.

On the other hand, the molded surface fastener 100 of Patent Document 1 as shown in FIG. 16 is formed to have a large width dimension of the resin-intrusion-preventing wall portion 102, as mentioned above, in order to have appropriate flexibility. However, in a case that the molded surface fastener 100 having the resin-intrusion-preventing wall portion 102 having a large width dimension is fixed to the fastener attaching surface of the molding die by being attracted to a long and thin magnet having a small width dimension, for example, the width dimension between the outer surfaces of the right and left resin-intrusion-preventing wall portions 102 of the molded surface fastener 100 is larger than the width dimension of the long and thin magnet in some cases.

In this case, there has been a problem that only either of the right and left resin-intrusion-preventing wall portions 102 is accidentally attracted to the long and thin magnet of the molding die, and a position of the molded surface fastener 100 tends to be displaced in the width direction with respect to the fastener attaching surface of the molding die. Further, if the position of the molded surface fastener 100 is displaced in the width direction, it can be considered that one of the right and left resin-intrusion-preventing wall portions 102 in the molded surface fastener 100 cannot be adhered to the molding die, and as a result, at the time of foam molding of the cushion body, the foam resin material may intrude into the engaging area from the outside area of the resin-intrusion-preventing wall portion 102 over the resin-intrusion-preventing wall portion 102.

In the molded surface fastener 100 of Patent Document 1, the right and left resin-intrusion-preventing wall portions 102 have a complicated shape to continue in a zig-zag shape with a constant height dimension. Further in this case, each divided vertical wall portion 115 forming the resin-intrusion-preventing wall portion 102 is formed to be long and thin in the length direction, and the connecting wall portion 113 forming the resin-intrusion-preventing wall portion 102 is formed to be long and thin in the width direction.

When the molded surface fastener 100 of Patent Document 1 which has the resin-intrusion-preventing wall portion 102 in such a complicated shape is molded by using a molding apparatus having a die wheel explained in Patent Document 1, for example, and discharging molten synthetic resin containing magnetic particles and molten synthetic resin not containing magnetic particles toward the die wheel, a cavity space provided on the die wheel for molding the right and left resin-intrusion-preventing wall portions 102 is formed in a complicated and narrow shape to correspond to the resin-intrusion-preventing wall portion 102.

Therefore, although the molten synthetic resin containing magnetic particles are discharged toward the die wheel, the molten synthetic resin which has lower flowability than the synthetic resin not containing magnetic particles, for example, is hard to fill the cavity of the resin-intrusion-preventing wall portion 102. As a result, defects may have occurred in some cases that the resin-intrusion-preventing wall portion 102 cannot be formed in a predetermined shape, or the magnetic particles leak from the resin-intrusion-preventing wall portion 102 and enter into the engaging element 103 in a hook shape, which lowers a strength of the engaging element 103.

In the case that the magnetic particles leak from the resin-intrusion-preventing wall portion 102, as mentioned above, it has occurred in some cases that the synthetic resin not containing the magnetic particles enters into the resin-intrusion-preventing wall portion 102. When the synthetic resin not containing the magnetic particles enter into the resin-intrusion-preventing wall portion 102 and the resin-intrusion-preventing wall portion 102 is formed, the synthetic resin not containing the magnetic particles and the synthetic resin containing the magnetic particles are mixed within the resin-intrusion-preventing wall portion 102, and are exposed on an outer surface of the resin-intrusion-preventing wall portion 102. In such a case, when an imaging test is conducted, for example, it is difficult to determine whether the magnetic particles are appropriately contained in the resin-intrusion-preventing wall portion 102 or not.

The present invention was made in view of the above conventional problems, and its objective is to provide a molded surface fastener which is molded by performing two-color molding using molten synthetic resin containing magnetic particles and molten synthetic resin substantially not containing magnetic particles, in which a part containing the magnetic particles is stably formed in a predetermined shape, and a leak of the magnetic particles to a part of an engaging element and the like formed of the synthetic resin substantially not containing magnetic particles is suppressed, and a manufacturing method for manufacturing the molded surface fastener.

Means for Solving the Problems

In order to achieve the above objective, a molded surface fastener provided by the invention has a base portion in a thin-plate shape, right and left outer wall portions standing on an upper surface of the base portion along a length direction, and a plurality of engaging elements disposed between the right and left outer wall portions, and is formed by melting to integrate first synthetic resin and second synthetic resin containing magnetic particles at a certain ratio, in which at least each upper end part of the right and left outer wall portions is formed of the first synthetic resin only, right and left magnetic wall portions in which at least each upper end part is formed of the second synthetic resin only stand on an upper surface of the base portion, each of the right and left magnetic wall portions is disposed along a length direction at a position between the outer wall portion and the engaging element in a width direction, as the main feature.

In the molded surface fastener according to the present invention, it is preferable that the magnetic wall portion has a mixed area formed of the first synthetic resin and the second synthetic resin being mixed.

In the molded surface fastener of the present invention, it is preferable that the base portion has grooved channel portions which are grooved on an upper surface part of the base portion and disposed between each outer wall portion and each magnetic wall portion, and between the engaging element and each magnetic wall portion.

In this case, it is preferable that the grooved channel portions have a constant channel depth from an upper surface of the base portion and are grooved continuously along the length direction. It is also preferable that the grooved channel portions have an inner grooved channel portion disposed on the engaging element-side of the magnetic wall portion, an outer grooved channel portion disposed on the outer side wall portion-side of the magnetic wall portion, and a width dimension of the inner grooved channel portion and a width dimension of the outer grooved channel portion have different sizes from each other.

Further in the molded surface fastener of the present invention, it is preferable that a height dimension of the magnetic wall portion is the same as a height dimension of the outer wall portion.

It is also preferable that the magnetic wall portion has a plurality of magnetic wall bodies disposed intermittently at predetermined pitches along the length direction.

In the present invention, it is preferable that each magnetic wall body has a mixed area formed of the first synthetic resin and the second synthetic resin being mixed, and the mixed area is disposed disproportionately on one side of the length direction of the molded surface fastener.

Further, it is preferable that a dimension of the magnetic wall portion in the width direction is the size as same as to six times an average particle size of the magnetic particles.

In addition, the molded surface fastener is preferably formed such that, in a state that the molded surface fastener is attached to the molding die of a cushion body to which the molded surface fastener is integrated, at least a part of an upper surface of the left-side magnetic wall portion and at least a part of the upper surface of the right-side magnetic wall portion are formed to be able to contact a magnet mounted on the molding die.

Next, according to the present invention, provided as the most main feature is a manufacturing method of a molded surface fastener having a base portion in a thin plate shape, right and left outer wall portions standing on an upper surface of the base portion along a length direction, and a plurality of engaging elements disposed between the right and left outer wall portions using a molding apparatus having a die wheel rotating in one direction, and an extrusion nozzle discharging first synthetic resin and second synthetic resin which contains magnetic particles at a predetermined ratio in a molten state toward the die wheel, the method including discharging the first synthetic resin from a first discharging outlet of the extrusion nozzle and discharging the second synthetic resin from a second discharging outlet of the extrusion nozzle toward the rotating die wheel, forming at least each upper end part of the right and left outer wall portions with the first synthetic resin only, and molding right and left magnetic wall portions in which at least each upper end part is formed of the second synthetic resin only and each of which is disposed along the length direction at a position in the width direction between the outer wall portion and the engaging element on an upper surface of the base portion.

The manufacturing method of the molded surface fastener in the present invention also preferably includes forming the die wheel by laminating a plurality of ring-shaped laminated plates in a rotating shaft direction, using a plurality of first laminated plates having a certain radius and a plurality of second laminated plates having a certain radius larger than the first laminated plates as the laminated plate, using two of the second laminated plates as a pair for each second discharging outlet, arranging the pair of second laminated plates so that the second discharging outlet is disposed between the pair of second laminated plates, and molding a grooved channel portion grooved on an upper surface part of the base portion and disposed on the both right and left sides of each magnetic wall portion in the molded surface fastener by a difference of the radius in the first laminated plate and in the second laminated plate in the die wheel.

Effects of the Invention

The molded surface fastener according to the present invention is formed by melting to integrate first synthetic resin substantially not containing magnetic particles and second synthetic resin containing magnetic particles at a certain ratio. This molded surface fastener has a thin plate-shaped base portion, right and left outer wall portions standing on an upper surface of the base portion along the length direction, a plurality of engaging elements disposed between right and left outer wall portions, and right and left magnetic wall portions standing at a position in the width direction between the outer wall portion and the engaging element along the length direction.

In the molded surface fastener of the present invention, at least each upper end part of the right and left outer wall portions is formed of only first synthetic resin substantially not containing magnetic particles. Further, at least each upper end part of the right and left magnetic wall portions is formed of only second synthetic resin containing magnetic particles at a certain ratio.

The second synthetic resin is discharged (extruded) to a die wheel, described later, in a molten state at the time of molding a molded surface fastener, and forms the molded surface fastener together with the molten first synthetic resin at an outer peripheral surface part of the die wheel. Therefore, in the molded surface fastener of the present invention, a boundary between a part containing magnetic particles and a part substantially not containing magnetic particles is not clearly formed, and the magnetic wall portion is formed such that the first synthetic resin and the second synthetic resin are mixed vaguely (unclearly), which is unlike a conventional type of molded surface fastener formed by fixing a monofilament containing magnetic particles to a base material portion, for example.

According to the above-mentioned molded surface fastener of the present invention, right and left magnetic wall portions in which at least each upper end part is formed of second synthetic resin only are disposed at a different position in an inside in the width direction of the molded surface fastener (position near the engaging element) with respect to the right and left outer wall portions which prevent intrusion (or mainly prevent intrusion) of foam resin at the time of foam molding of a cushion body. Thereby, as a shape of the right and left magnetic wall portions, a shape different from that of the right and left outer wall portions which prevent intrusion of foam resin can be employed. Therefore, the right and left magnetic wall portions can be formed in a simple shape so that, for example, the molten second synthetic resin containing magnetic particles (i.e. molten second synthetic resin having relatively low flowability) is easily poured into the cavity which forms magnetic wall portions.

Therefore, in a molding process for molding the molded surface fastener using a die wheel, for example, the molten second synthetic resin is discharged to the die wheel to be poured into the cavity for molding the magnetic wall portions in a die wheel, and the second synthetic resin can be suppressed (prevented) from leaking to other part due to a defect in filling to the cavity. Accordingly, the molded surface fastener of the present invention has right and left magnetic wall portions provided with a predetermined shape in which at least each upper end part is formed of the second synthetic resin, and right and left outer wall portions by which leak of the second synthetic resin is suppressed (or prevented) and having a predetermined shape and an appropriate strength and a plurality of engaging elements stably.

Further, the molded surface fastener of the present invention is formed to be easy to fill in the cavity for molding the magnetic wall portions with the second synthetic resin containing magnetic particles in the molding process. Therefore, at least each upper end part of the magnetic wall portions can be stably formed of the second synthetic resin. Thereby, in a case that a molding die provided with a magnet at a fastener attaching surface is used at the time of foam molding of a cushion body, a larger magnetic force can be stably obtained between the magnet of the molding die and the magnetic particles contained in the molded surface fastener.

Accordingly, the molded surface fastener can be attracted with a larger attractive force and fixed firmly to the fastener attaching surface of the molding die. Also due to the large magnetic force generated between the magnet of the molding die and the magnetic particles of the molded surface fastener, a self-alignment effect that a position and a direction of the molded surface fastener to be attached can be adjusted accurately and automatically to correspond to a position and a direction of the magnet disposed on a fastener holding portion of the molding die can be stably obtained.

Furthermore, at least an upper end part of the magnetic wall portion can be stably formed only of the second synthetic resin, and the first synthetic resin and the second synthetic resin can be prevented from being mixed at the upper end part. Therefore, when an imaging test of the magnetic particles is conducted to the molded surface fastener, for example, it can be easily and stably checked whether the magnetic particles are appropriately contained in the right and left magnetic wall portions (upper end part of the magnetic wall portions, in particular).

In addition, the molded surface fastener is formed such that the right and left magnetic wall portions are arranged inside the right and left outer wall portions, thereby a distance between the right and left magnetic wall portions can be smaller easily than a distance between the right and left resin-intrusion-preventing wall portions in the molded surface fastener of Patent Document 1 (see FIG. 16). Therefore, for example, even when a magnet having a small width dimension is used for a molding die which is used at the time of foam molding of the cushion body, both the right and left magnetic wall portions in the molded surface fastener can be stably attracted with the long and thin magnet of the molding die, thereby the molded surface fastener can be stably attached to a fastener attaching surface of the molding die without a position displacement. Further, thereby, it can be stably prevented that a foam resin material is intruded at the time of foam molding into the engaging area formed of a plurality of engaging elements due to the position displacement of the molded surface fastener with respect to the fastener attaching surface of the molding die.

In such a molded surface fastener of the present invention, the right and left magnetic wall portions have a mixed area formed of the first synthetic resin substantially not containing magnetic particles and second synthetic resin containing magnetic particles at a certain ratio being mixed between the upper end part of the magnetic wall portions and the base portion. Thereby, the first synthetic resin and the second synthetic resin are mixed, and a boundary part between the first synthetic resin and the second synthetic resin is formed vaguely (unclearly).

Therefore, adhesion between a part of the second synthetic resin containing the magnetic particles and a part of the first synthetic resin substantially not containing the magnetic particles can be significantly improved. Thus, in the molding process of the molded surface fastener, for example, even when the molded surface fastener receives a large pulling force when the molded surface fastener is peeled off from the die wheel, the molded surface fastener can be less likely to be cracked or torn, and as a result, production efficiency and yields of the molded surface fastener can be improved.

In the present invention, the base portion of the molded surface fastener has grooved channel portions grooved on an upper surface part of the base portion and disposed between each outer wall portion and each magnetic wall portion as well as between the engaging element and each magnetic wall portion. Thereby, when the molded surface fastener is manufactured by molding the die wheel as mentioned above, the second synthetic resin containing the magnetic particles can be effectively suppressed or prevented from leaking to the outer wall portion and the engaging element over the right and left grooved channel portions provided on each magnetic wall portion.

In this case, the grooved channel portions provided on both of the right and left sides of the magnetic wall portion have a constant channel depth from the upper surface of the base portion, and grooved continuously along the length direction. Therefore, the second synthetic resin can be suppressed or prevented from leaking from the magnetic wall portion to the outer wall portion, the engaging element and others for entire length direction of the molded surface fastener.

Further in the present invention, the grooved channel portions provided on each magnetic wall portion have an inner grooved channel portion disposed on the engaging element-side of the magnetic wall portion and an outer grooved channel portion disposed on the outer wall portion-side of the magnetic wall portion. In this case, a width dimension (dimension in the width direction) of the inner grooved channel portion and a width dimension of the outer grooved channel portion have different sizes from each other.

For example, by setting the width dimension of the outer grooved channel portion larger than the width dimension of the inner grooved channel portion, it can be prevented more effectively that the second synthetic resin containing the magnetic particles leaks from the magnetic wall portion to the outer wall portion on the outer side. Further, by setting the width dimension of the inner grooved channel portion smaller than the width dimension of the outer grooved channel portion, when the molded surface fastener is cut at an appropriate length dimension, foam resin can be suppressed or prevented from intruding into an engaging area from an end edge part (front end edge part and rear end edge part) in the length direction through a gap (space part) formed at the inner grooved channel portion or above the inner grooved channel portion.

Further in the molded surface fastener of the present invention, a height dimension (dimension in a height direction) of the magnetic wall portion is as the same as a height dimension of the outer wall portion. Therefore, when the molded surface fastener is attached to the fastener attaching surface of the molding die in a foam molding process of the cushion body, the right and left outer wall portions and the right and left magnetic wall portions of the molded surface fastener can be adhered to the fastener attaching surface of the molding die. Thereby, the attaching condition of the molded surface fastener to the fastener attaching surface of the molding die can be more stabilized. Further, sealing properties between the molded surface fastener and the fastener attaching surface of the molding die can also be further enhanced, and the foam resin can be less likely to climb over the outer wall portion and the magnetic wall portion of the molded surface fastener, thus the foam resin can be more effectively prevented from intruding into the engaging area of the molded surface fastener.

Further, the magnetic wall portion has a plurality of magnetic wall bodies disposed intermittently at a predetermined pitch along the length direction. Thereby, when compared with a case that the magnetic wall portion is formed as a continuous vertical wall portion which is disposed continuously with a constant height dimension along the length direction, for example, flexibility of the molded surface fastener can be significantly enhanced.

In the present invention, each magnetic wall body has each mixed area as mentioned above, and the mixed area of each magnetic wall body is disposed disproportionately on one side of the length direction (front side of the machine direction, for example) of the molded surface fastener. Thereby, even when the molded surface fastener receives pulling forces from various directions, the magnetic wall body can be less likely to be cracked or torn.

A dimension of the magnetic wall portion in the width direction is one to six times the size of the average particle size of the magnetic particles. Thus, the magnetic particles can be stably contained in the magnetic wall portion. Also the molded surface fastener can have moderate flexibility.

In addition, the molded surface fastener is formed such that, in a state of being attached to a molding die of a cushion body to which the molded surface fastener is integrated, at least a part on an upper surface of the left-side magnetic wall portion and at least a part on an upper surface of the right-side magnetic wall portion can contact with a magnet mounted on the molding die. Thereby, the molded surface fastener of the present invention can be stably fixed to a predetermined position of the molding die with a magnetic force.

Next, in a manufacturing method of a molded surface fastener provided by the present invention, a molded surface fastener is manufactured by using a molding apparatus having a die wheel rotating in one direction, and an extrusion nozzle discharging first synthetic resin substantially not containing magnetic particles and second synthetic resin containing magnetic particles at a certain ratio in a molten state, discharging the first synthetic resin from a first discharging outlet of the extrusion nozzle and discharging the second synthetic resin from a second discharging outlet of the extrusion nozzle.

In this case, in the manufacturing method of the present invention, at least an upper end part of the right and left outer wall portions is formed only of the first synthetic resin substantially not containing magnetic particles. On an upper surface of the base portion, right and left magnetic wall portions disposed at a position in the width direction between an outer wall portion and an engaging element along the length direction is formed on the upper surface of the base portion, and at least each upper end part of the magnetic wall portion is formed only of the second synthetic resin containing magnetic particles at a certain ratio.

According to the manufacturing method of the present invention, the right and left magnetic wall portions can be formed in a simple shape which is different from that of the right and left outer wall portions and so that the second synthetic resin are easy to be poured in a cavity of the magnetic wall portions provided on the die wheel. Thereby, the magnetic wall portions can be stably formed in a predetermined shape, and it can be suppressed (or prevented) that the second synthetic resin leaks to other part due to a defect in filling to a cavity. Therefore, according to the manufacturing method of the present invention, the above-mentioned molded surface fastener having the right and left magnetic wall portions provided with a predetermined shape and in which at least each upper end part is formed of the second synthetic resin, right and left outer wall portions provided with a predetermined shape and appropriate strength, and a plurality of engaging elements can be stably manufactured.

In the manufacturing method of the present invention, the die wheel is formed by laminating a plurality of ring-shaped laminated plates in a rotating shaft-direction, and as the laminated plate of the die wheel, a plurality of first laminated plates having a certain radius, and a plurality of second laminated plates having a certain radius larger than that of the first laminated plate are used.

Further in this case, a pair of two second laminated plates are used to each second discharging outlets, and this pair of second laminated plates are arranged so that the second discharging outlet is disposed between the pair of the second laminated plates. Thus, the first synthetic resin is discharged from the first discharging outlet of the extrusion nozzle while the second synthetic resin is discharged from the second discharging outlet of the extrusion nozzle toward the die wheel having the first laminated plate and the second laminated plate. Thereby, the molded surface fastener can be stably manufactured while the second synthetic resin containing magnetic particles is suppressed or prevented from leaking to the outer wall portions or the engaging elements and the grooved channel portion is provided on the both right and left sides of the magnetic wall portions.

DESCRIPTION OF EMBODIMENT

Hereinafter, preferred embodiments of the present invention are described in detail with Embodiments referring to drawings. It should be noted that the present invention is not limited thereto, and various changes can be made as long as they have a substantially same structure and same functional effects. For example, in the present invention, a length dimension and a width dimension of the molded surface fastener, and the number, an arrangement position and a forming density of the engaging elements disposed on the base portion of the molded surface fastener are not limited in particular, and can be changed arbitrarily.

Embodiment 1

Figure 1:
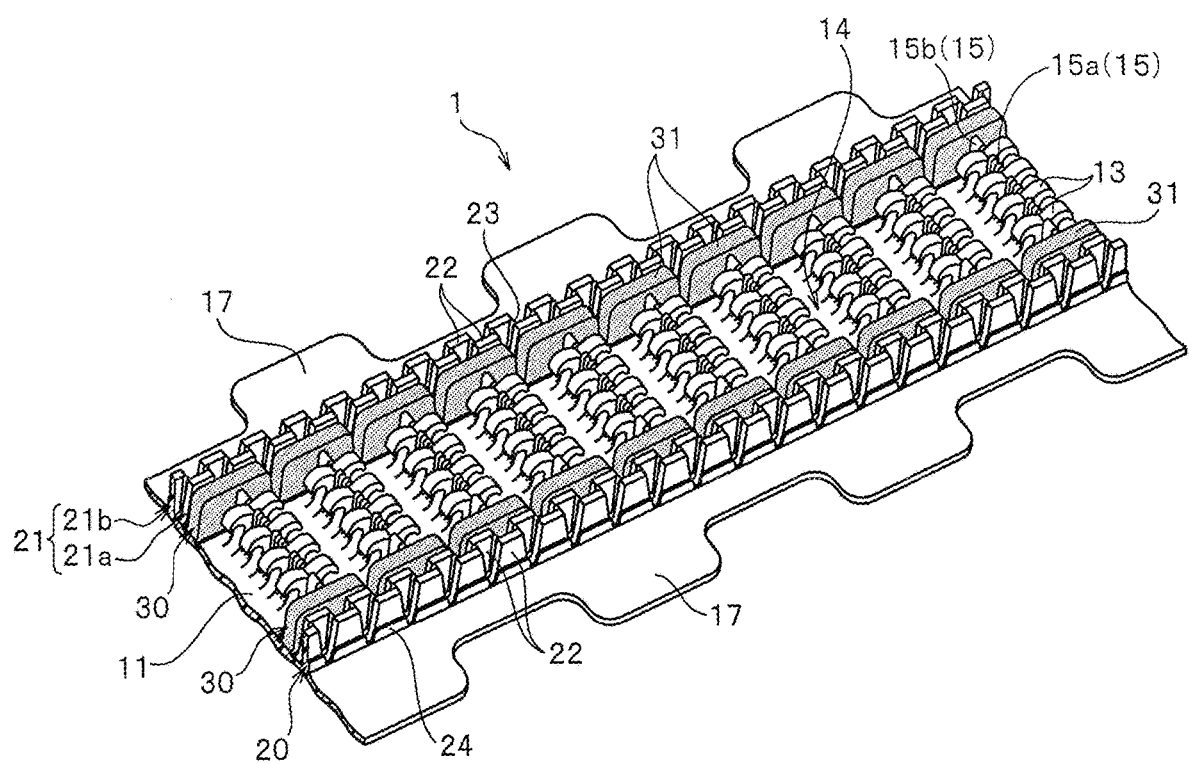
FIG. 1 is a perspective view illustrating a molded surface fastener according to Embodiment 1 of the present invention.
Figure 2:
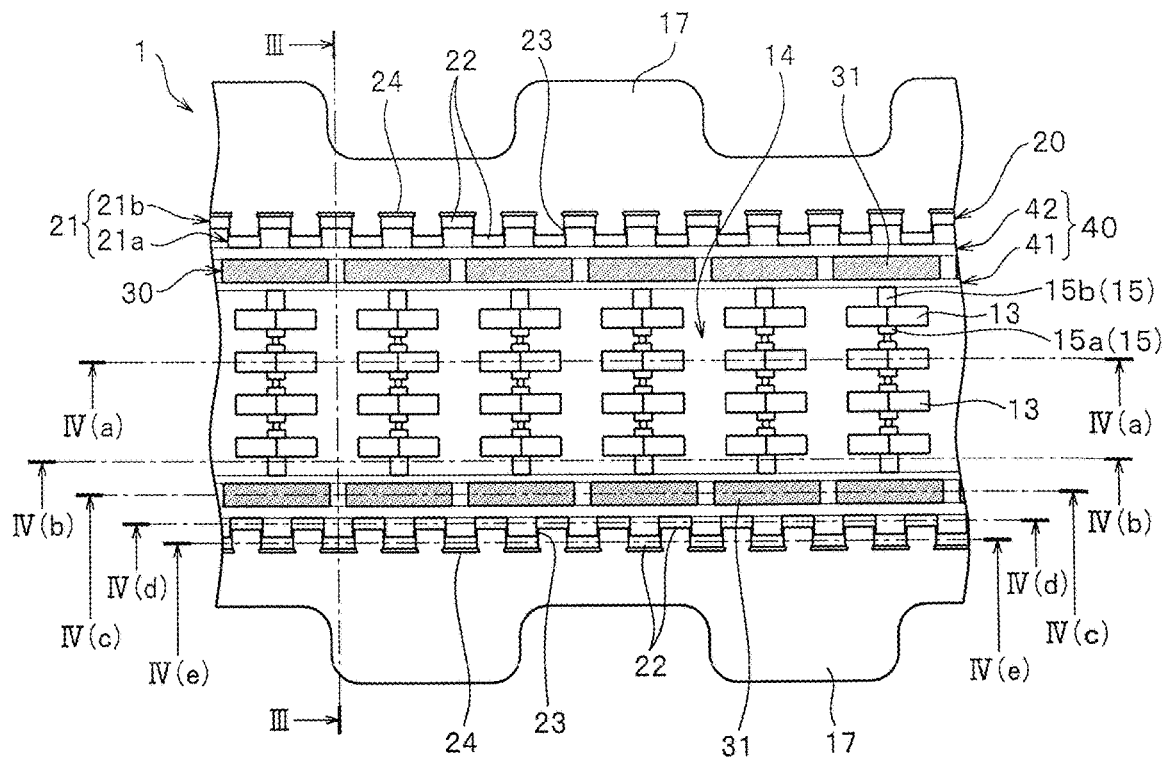
FIG. 2 is a plan view of the molded surface fastener.
Figure 3:
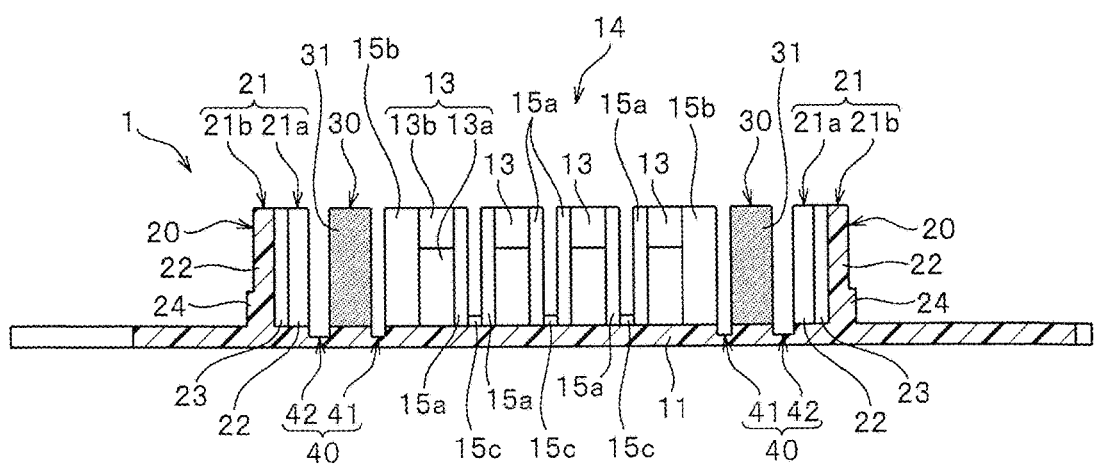
FIG. 3 is a cross-sectional view in line shown in FIG. 2.
Figure 4:
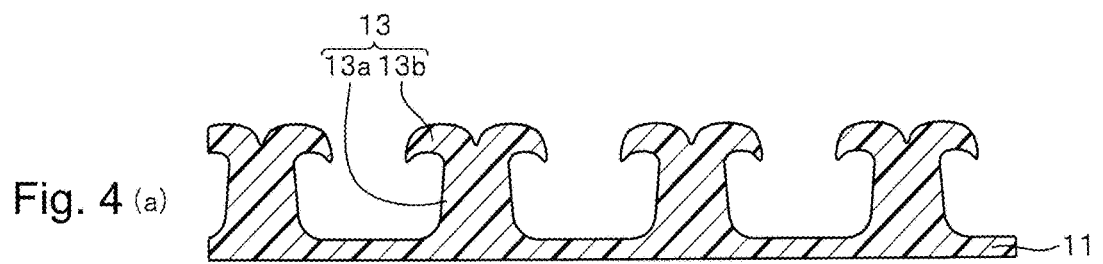
FIGS. 4(*a*), 4(*b*), 4(*c*), 4(*d*), and 4(*e*), collectively referred to as FIG. 4. are each cross-sectional views in IV(a)-IV(a) line to IV(e)-IV(e) line shown in FIG. 2.
Figure 4:
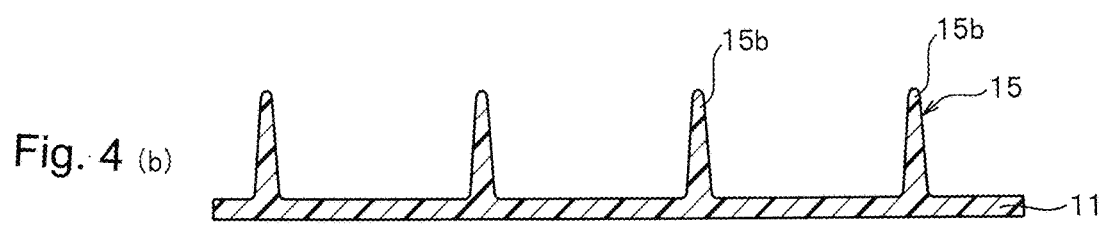
Figure 4:
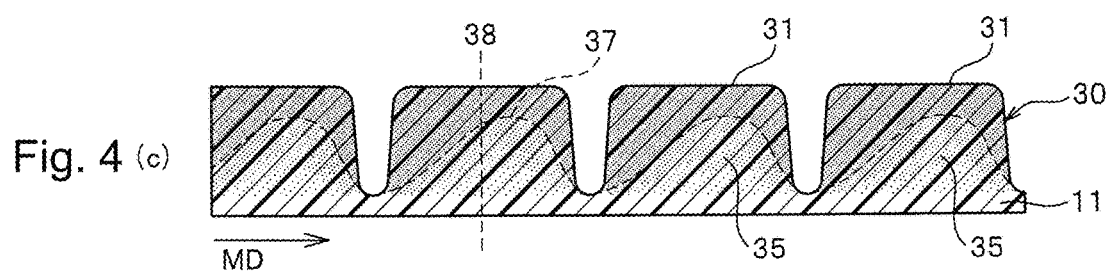
Figure 4:
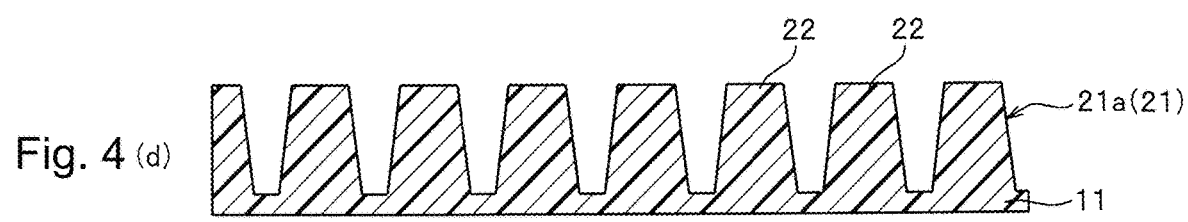
Figure 4:
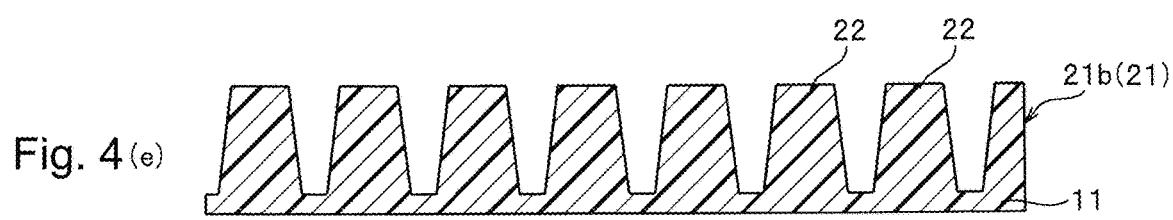

FIG. 1 is a perspective view illustrating a molded surface fastener according to Embodiment 1. FIG. 2 is a plan view of the molded surface fastener, and FIG. 3 is a cross-sectional view in line shown in FIG. 2. FIG. 4 are cross-sectional views in IV(a)-IV(a) line to IV(e)-IV(e) line shown in FIG. 2, respectively.

In the following descriptions, a front and rear direction regarding the molded surface fastener means a length direction (length direction of the base portion, in particular) of the molded surface fastener which is molded in a long shape as described later, and a direction along a machine direction (MD) in which the molded surface fastener is continuously molded in a molding process of the molded surface fastener.

A right and left direction means a width direction perpendicular to the length direction and along an upper surface (or a lower surface) of the base portion of the molded surface fastener. In this case, the right and left direction and the width direction can also be said as a crossing direction (CD) perpendicular to the machine direction (MD). An upper and lower direction (thickness direction) means a height direction perpendicular to the length direction and perpendicular to the upper surface (lower surface) of the base portion of the molded surface fastener. Particularly, a direction on a side engaging elements are formed with respect to a base portion is the upper direction, and an opposite direction is the lower direction.

Figure 5:
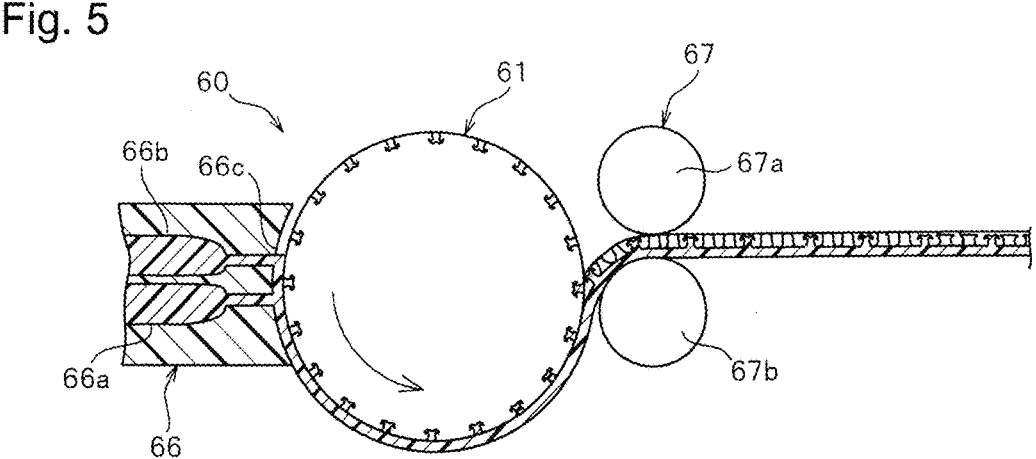
FIG. 5 is a schematic view illustrating a manufacturing apparatus of a molded surface fastener.

A molded surface fastener 1 according to Embodiment 1 has a base portion 11 in a thin plate shape and long in the front and rear direction, right and left outer wall portions 20 standing on right and left side edge parts of the base portion 11, a plurality of male engaging elements 13 in a hook shape and disposed between the right and left outer wall portions 20, a lateral wall portion 15 disposed along the right and left direction, right and left magnetic wall portions 30 disposed adjacent to an inside of the right and left outer wall portions 20 and containing magnetic particles, and fin piece portions 17 extended from right and left side edges of the base portion 11 outward in the width direction. The molded surface fastener 1 is manufactured using a molding apparatus 60 described later as shown in FIG. 5, and is formed long in the machine direction (MD) along a conveying pass of the molding apparatus 60.

The molded surface fastener 1 of Embodiment 1 is formed by melting first synthetic resin substantially not containing magnetic particles and second synthetic resin containing magnetic particles at a certain ratio, separately, and integrating them. In the present invention, although materials of the first synthetic resin and the second synthetic resin are not particularly limited, thermoplastic resin such as polyamide resin, polyester resin, polypropylene resin, PVC resin, ABS resin, polyethylene resin or copolymer thereof can be adopted as the first synthetic resin.

The second synthetic resin is formed by containing (mixing) magnetic particles consisting of alloy of iron, cobalt, nickel and others into thermoplastic resin such as polyamide resin, polyester resin, polypropylene resin, PVC resin, ABS resin, polyethylene resin or copolymer thereof at a certain ratio as described later. In the present invention, the magnetic particle means a particle generating magnetism when a magnetic field is generated, and a material of the magnetic particles is not particularly limited as long as it is a material attracted to a magnet magnetically. Each particle size and average particle size of the magnetic particles can be arbitrarily changed.

In each drawing of FIG. 1 to FIG. 4 of Embodiment 1, a part containing magnetic particles of the molded surface fastener 1 is represented in a gray color.

Also, in the actually manufactured molded surface fastener 1, the molded surface fastener 1 can be colored in a desired color (green, for example) by containing pigment and the like to the synthetic resin. A part containing magnetic particles of the molded surface fastener 1 shows a black or gray color due to magnetic particles, in contrast to the colored color (green, for example) of the molded surface fastener 1. Therefore, in a case of Embodiment 1, the first synthetic resin shows a green color, and the second synthetic resin shows a black or gray color.

The base portion 11 of the molded surface fastener 1 is formed in a thin plate shape having a small thickness dimension in the upper and lower direction. On an upper surface of the base portion 11, right and left outer wall portions 20, a plurality of engaging elements 13, right and left magnetic wall portions 30 and a plurality of lateral wall portions 15 stand, and on the right and left both sides of each magnetic wall portion 30, a grooved channel portion 40 as described later is grooved along the length direction.

A lower surface of the base portion 11 is formed in a flat surface. In the present invention, it is also possible, when a cushion body is foam molded to integrate the molded surface fastener 1 to the cushion body, to provide a plurality of groove portions or protruded rib portions parallel to the length direction on the lower surface of the base portion 11 in order to secure a large contacting area between the molded surface fastener 1 and the cushion body and enhance a fixing strength.

The right and left outer wall portions 20 in Embodiment 1 are provided at a position slightly inside the right and left side end edges of the base portion 11 and near the side edge along the front and rear direction. In the present invention, the position of the right and left outer wall portions 20 in the width direction (right and left direction) can be changed arbitrarily as long as it is in a predetermined area from the left side-end edge and the right side-end edge of the base portion 11 (area of 30% or smaller of the width dimension of the base portion 11 from the left side-end edge or the right side-end edge of the base portion 11, for example).

The right and left outer wall portions 20 in Embodiment 1 are provided as a resin intrusion-preventing wall portion which prevents foam resin from intruding into an engaging area 14 on which a plurality of engaging elements 13 are disposed from an outside in the width direction at the time of foam molding of a cushion body. In Embodiment 1, in particular, the outer wall portion 20 independently forms the resin intrusion-preventing wall portion. The outer wall portion 20 of Embodiment 1 is explained in detail here. However, if the outer wall portion 20 can independently prevent the foam resin from intruding from the width direction, the outer wall portion 20 of Embodiment 1 may be formed in another shape and a structure of the outer wall portion 20 is not limited to Embodiment 1.

Each of the right and left outer wall portions 20 has two rows of vertical wall row 21 formed to be parallel to the length direction, a connecting wall portion 23 connecting between divided vertical wall portions 22 described later of the two rows of the vertical wall row 21, and a reinforcement portion 24 provided on an outer wall surface side of the divided vertical wall portion 22 of the vertical wall row 21 (second vertical wall row 21b described later) disposed outside in the width direction.

Each of the right and left outer wall portions 20 of Embodiment 1 has two rows of the vertical wall row 21 which are a first vertical wall row 21a disposed to be inside near the engaging element 13 in the width direction, and the second vertical wall row 21b disposed outside to be apart from the engaging element 13. Each of these first vertical wall row 21a and the second vertical wall row 21b has a plurality of divided vertical wall portions 22 disposed in a line along the length direction and disposed intermittently at a predetermined forming pitch.

In this case, the divided vertical wall portion 22 of the first vertical wall row 21a and the divided vertical wall portion 22 of the second vertical wall row 21b are formed in a same shape and a same size each other. Between the two divided vertical wall portions 22 disposed adjacent in the length direction of each vertical wall row 21, a predetermined gap is provided. In Embodiment 1 in particular, a forming pitch of the divided vertical wall portions 22 disposed on each vertical wall row 21 is a half of a forming pitch of the engaging elements 13 in the length direction.

Further, the divided vertical wall portion 22 of the first vertical wall row 21a and the divided vertical wall portion 22 of the second vertical wall row 21b are disposed to be in a staggered arrangement position which is displaced at a half size of the forming pitch of the divided vertical wall portions 22 in the length direction. The divided vertical wall portions 22 in the first vertical wall row 21a and the second vertical wall row 21b are entirely arranged in a zigzag pattern.

Each divided vertical wall portion 22 of Embodiment 1 stands on the base portion 11 and is formed to be long and thin in the length direction and in a square frustum shape in which its length dimension in the front and rear direction is gradually decreased upward. Thus, the divided vertical wall portion 22 shows a substantially frustum shape when viewed from the right and left sides. The upper surface (top end surface) of the divided vertical wall portion 22 is formed to be a flat surface perpendicular to the height direction.

A height dimension from the upper surface of the base portion 11 to the upper surface of the divided vertical wall portion 22 in each divided vertical wall portion 22 in the upper and lower direction is the same size as the maximum value of the height dimension of the engaging element 13 from the upper surface of the base portion 11, and is the same size as the height dimension from the upper surface of the base portion 11 to the upper surface of the magnetic wall portion 30 in the magnetic wall portion 30.

The connecting wall portion 23 of Embodiment 1 is provided between the first vertical wall row 21a and the second vertical wall row 21b along the right and left direction. Each connecting wall portion 23 connects a front end part (or a rear end part) of the divided vertical wall portion 22 disposed on the first vertical wall row 21a and a rear end part (or a front end part) of the divided vertical wall portion 22 disposed on the second vertical wall row 21b each other.

The height dimension of each connecting wall portion 23 from the upper surface of the base portion 11 is the same as that of the first vertical wall row 21a and the second vertical wall row 21b. That is, the outer wall portion 20 of Embodiment 1 is formed of the divided vertical wall portions 22 of the first vertical wall row 21a and the second vertical wall row 21b, and the connecting wall portion 23, so as to meander serially in a zigzag way in a continuous manner and having the constant height dimension.

Thus, when the molded surface fastener 1 is adhered with a cavity surface (fastener attaching surface 72) of a molding die 70 described later, an outside area of the outer wall portion 20 and an engaging area 14 of the molded surface fastener 1 are segmented by the right and left outer wall portions 20, thereby foam resin of the cushion body can be prevented from intruding into the engaging area 14 from the outside area over the outer wall portions 20.

It should be noted that a margin of error is included in the state that the height dimension of the connecting wall portion 23 and the height dimension of the divided vertical wall portion 22 are the same. For example, it is regarded that the divided vertical wall portion 22 and the connecting wall portion 23 have the same height dimensions in the present invention, even in a case that, when the height dimension of the connecting wall portion 23 and the height dimension of the divided vertical wall portion 22 are substantially the same, and the molded surface fastener 1 is adhered to the fastener attaching surface 72 of the molding die 70, for example, a tiny gap through which foam resin cannot pass is formed between the fastener attaching surface 72, the connecting wall portion 23 and the divided vertical wall portion 22.

A plurality of the engaging elements 13 formed in Embodiment 1 stand in the length direction and the width direction with predetermined forming pitches in order to obtain a predetermined adhering force (engaging force) between a skin member covering on the cushion body. In Embodiment 1, in particular, the engaging elements 13 are disposed to line in a row at predetermined forming pitches along the length direction, and vertical rows of the engaging elements 13 are disposed to line in four rows in the width direction.

In the present invention, an area between the right and left magnetic wall portions 30 on which a plurality of such engaging elements 13 are disposed is defined as the engaging area 14. In the present invention, an arrangement pattern of the engaging elements 13 is not particularly limited. It is also possible that the engaging area 14 is formed by lining up a plurality of the engaging elements 13 at a predetermined arrangement pattern such as a zigzag pattern between the right and left magnetic wall portions 30, or by arranging the engaging elements 13 randomly, for example.

Each engaging element 13 of Embodiment 1 is formed to have a similar shape to the engaging element described in Patent Document 1. That is, the engaging element 13 of Embodiment 1 has a rising portion 13a rising vertically from the upper surface of the base portion 11, and an engaging head portion 13b in a hook shape curving and extending at an upper end of the rising portion 13a toward the front and rear in the length direction.

In this case, the maximum value of the height dimension from the upper surface of the base portion 11 in each engaging element 13 is as the same size as the height dimension of the divided vertical wall portion 22 from the upper surface of the base portion 11, and the height dimension of the magnetic wall portion 30 from the upper surface of the base portion 11. In the present invention, a shape and a dimension of each engaging element 13 are not particularly limited, and can be changed arbitrarily. For example, it is also possible to set the height dimension of the engaging element 13 from the upper surface of the base portion 11 to be lower than the divided vertical wall portion 22.

The lateral wall portion 15 in Embodiment 1 is provided integrally to continue with the engaging element 13 on the right and left both sides of each engaging element 13. The lateral wall portion 15 of Embodiment 1 has a first lateral wall portion 15a provided between the engaging elements 13 adjacent to each other in the width direction and having a small width dimension (dimension in the width direction), and a second lateral wall portion 15b provided on a side surface of the engaging element 13 facing to the wall portion adjacent to the magnetic wall portion 30 and having a larger width dimension than the first lateral wall portion 15a.

The first lateral wall portion 15a is disposed from each engaging element 13 toward an engaging element 13 adjacent in the width direction along the width direction. Two first lateral wall portions 15a disposed adjacent to each other (i.e. the first lateral wall portion 15a provided integrally with the engaging element 13 and another first lateral wall portion 15a provided integrally with another engaging element 13 adjacent to the engaging element 13 in the width direction) are connected each other at a lower end part via a connecting lateral wall portion 15c protruded on the upper surface of the base portion 11. However, they are apart to each other with a small distance at an area upper than the connecting lateral wall portion 15c. That is, between the two first lateral wall portions 15a disposed adjacent to each other, the connecting lateral wall portion 15c connecting the both and a slit (space part) formed from the height position of an upper end of the first lateral wall portion 15a to the height position of an upper end of the connecting lateral wall portion 15c along the height direction are provided.

The second lateral wall portion 15b is provided along the width direction on an area between the engaging element 13 adjacent to the magnetic wall portion 30 and the grooved channel portion 40 in the width direction. Between the second lateral wall portion 15b and the magnetic wall portion 30, the slit (space part) having a width dimension corresponding to the grooved channel portion 40 are provided, and the second lateral wall portion 15b and the magnetic wall portion 30 are disposed to be apart to each other with a small distance.

The height dimension of the lateral wall portion 15 (i.e. the first lateral wall portion 15a and the second lateral wall portion 15b) from the upper surface of the base portion 11 is as the same as the maximum value of the height dimension of the engaging element 13 from the upper surface of the base portion 11, and the same as each height dimension of the divided vertical wall portion 22 and the connecting wall portion 23 from the base portion 11. That is, in the molded surface fastener 1 of Embodiment 1, each height dimension of the divided vertical wall portion 22, the connecting wall portion 23, the first lateral wall portion 15a and the second lateral wall portion 15b from the base portion 11 and the maximum value of the height dimension of the engaging element 13 from the base portion 11 are the same, and these upper surfaces or the upper ends are disposed on the same flat plane.

Accordingly, by attracting and fixing the molded surface fastener 1 to a fastener holding portion 71 of the molding die 70 at the time of foam molding of the cushion body, as described later, the divided vertical wall portion 22, the connecting wall portion 23, the engaging element 13, the first lateral wall portion 15a and the second lateral wall portion 15b of the molded surface fastener 1 can be stably adhered to a cavity surface (fastener attaching surface 72) of the fastener holding portion 71 of the molding die 70. Thereby, it can be prevented that foam resin is intruded into the engaging area 14 over the right and left outer wall portions 20 of the molded surface fastener from the width direction, and intruded into the engaging area 14 over the lateral wall portion 15 and the engaging element 13 from the length direction.

As mentioned above, a slit is provided on each of between the two first lateral wall portions 15a disposed adjacent to each other and between the second lateral wall portion 15b and the magnetic wall portion 30. However, since these slits are very small, possibility of foam resin of the cushion body passing through the slit (gap) between the first lateral wall portions 15a or the slit (gap) between the second lateral wall portion 15b and the magnetic wall portion 30 to intrude into the engaging area 14 is extremely small.

The right and left magnetic wall portions 30 of Embodiment 1 are disposed at a position between the outer wall portion 20 and the engaging area 14 regarding the width direction, and are respectively provided linearly along the length direction. Each magnetic wall portion 30 has a plurality of magnetic wall bodies 31 disposed to line in a row along the length direction.

In this case, a plurality of the magnetic wall bodies 31 in each magnetic wall portion 30 are disposed intermittently having predetermined forming pitches. A predetermined gap is provided between two magnetic wall bodies 31 disposed adjacent in the length direction, and the forming pitch of the magnetic wall bodies 31 in the length direction is as the same as the forming pitch of the engaging elements 13 in the length direction.

The magnetic wall bodies 31 are disposed intermittently at constant forming pitches, thereby the molded surface fastener 1 can be easy to be bent (easy to be bowed) compared with a case that the magnetic wall portion 30 is provided continuously at a constant height dimension along the length direction, for example. Therefore, moderate flexibility of the molded surface fastener 1 can be stably secured.

Each magnetic wall body 31 has an upper surface (top end surface) in a flat plane shape which is disposed perpendicular to the height direction. The magnetic wall body 31 is formed in a shape showing a substantially frustum shape in which a length dimension in the front and rear direction is gradually decreased upward when viewing the magnetic wall portion 30 from the right and left side direction-side.

Further, the magnetic wall body 31 is formed to have a constant width dimension.

In this case, a width dimension of the magnetic wall body 31 is larger than the width dimension of the divided vertical wall portion 22 of the first vertical wall row 21a and the second vertical wall row 21b. It is preferable that the width dimension of the magnetic wall body 31 is larger than an average particle size of the magnetic particles contained in the magnetic wall body 31, and it may be the same as to the six times the average particle size, for example. In the case of Embodiment 1, the width dimension of the magnetic wall body 31 is 0.6 mm.

As the magnetic wall body 31 has the above-mentioned width dimension, the molten second synthetic resin containing magnetic particles can be poured easily to the cavity forming the magnetic wall body 31 as described later when the molded surface fastener 1 is molded using a die wheel 61. Therefore, each magnetic wall body 31 can be stably formed in a predetermined shape, and the magnetic particles can be prevented from leaking to the outer wall portion 20, the lateral wall portion 15 and the engaging element 13.

The width dimension of the magnetic wall body 31 is smaller than the width dimension from a position of an inner wall surface of the divided vertical wall portion 22 of the first vertical wall row 21a to a position of an outer wall surface of the divided vertical wall portion 22 of the second vertical wall row 21b. Therefore, it can be suppressed that flexibility of the molded surface fastener 1 is lowered due to an increased size of the width dimension of the magnetic wall body 31. It also prevents that the width dimension of the engaging area 14 becomes too small along with the increase of the width dimension of the magnetic wall body 31, and an appropriate engaging strength of the molded surface fastener 1 can be stably secured. Further, it prevents that an distance between the right and left outer wall portions 20 becomes too large, thus both the right and left outer wall portions 20 can be stably adhered to the fastener attaching surface 72 of the fastener holding portion 71 of the molding die 70 at the time of foam molding of the cushion body.

In addition, the height dimension of each magnetic wall body 31 from the upper surface of the base portion 11 to the upper surface of the magnetic wall body 31 in the upper and lower direction is the same size as the height dimension of the divided vertical wall portion 22 in the first vertical wall row 21a and the second vertical wall row 21b. Since the magnetic wall body 31 has the same height dimension as the divided vertical wall portion 22, a lot of magnetic particles can be arranged at a higher position apart from the base portion 11 in the height direction. Therefore, a large attracting force by magnetic force can be stably generated between a magnet 73, described later, of the fastener attaching surface 72 of the molding die 70 and magnetic particles contained in the magnetic wall portion 30 of the molded surface fastener 1.

Thus, the molded surface fastener 1 is magnetically attracted to and held firmly by the fastener holding portion 71 of the molding die 70.

As mentioned above, magnetic particles are contained in each magnetic wall body 31 of the magnetic wall portion 30 in Embodiment 1. In this case, at least an upper end part of the magnetic wall body 31 is formed of the second synthetic resin only, and the magnetic particles are contained at the upper end part of the magnetic wall portion 30 at a certain concentration in a range of 30 wt % or higher and 80 wt % or lower. In FIG. 4, an approximate position of a boundary portion 37 is represented with a dash line in order to show a part of the magnetic wall body 31 formed of the second synthetic resin only (a part having a constant concentration of the magnetic particles) and a part of a mixed area 35 described later for easy understanding.

As the concentration of the magnetic particles at the upper end part of the magnetic wall body 31 (i.e. the concentration of the magnetic particles in the second synthetic resin) is 30 wt % or higher, particularly 40 wt %, a large attracting force by the magnetic force can be stably generated between the magnet 73 buried in the fastener holding portion 71 of the molding die 70 as described later and the magnetic particles contained in the magnetic wall portion 30 of the molded surface fastener 1. Also as the concentration of the magnetic particles at the upper end part of the magnetic wall body 31 is 80 wt % or lower, preferably 70 wt % or lower, each magnetic wall body 31 can secure an appropriate strength stably.

In the case of Embodiment 1, although the magnetic particles are contained in the magnetic wall portion 30, the connecting part connected to the magnetic wall body 31 in the base portion 11 and its vicinity, the magnetic particles are not contained substantially in the right and left outer wall portions 20, the engaging elements 13 and the lateral wall portion 15 of the molded surface fastener 1. In the present invention, in particular, at least an upper end part of the right and left outer wall portions 20 are formed of the first synthetic resin only in which the magnetic particles are not contained substantially.

In the present invention, magnetic particles may be contained in a part except for each upper end part in the right and left outer wall portions 20, the engaging element 13 and the lateral wall portion 15 at a lower ratio than that in the upper end part of the magnetic wall body 31. However, it is preferable not to be contained substantially. In a case a lot of magnetic particles are contained in a part of the outer wall portion 20, for example, the possibility is considered that, at the time of molding the molded surface fastener 1 using the die wheel 61, the first synthetic resin is hard to be poured into the cavity of the die wheel 61 for molding the outer wall portion 20 continuing in a zigzag shape, and the outer wall portion 20 cannot be molded in a predetermined shape. Further, in a case that a lot of magnetic particles are contained in the engaging element 13, it is considered that the engaging element 13 tends to be fragile which leads to a lowered engaging strength with respect to female engaging element in a loop shape. Therefore, it is preferable that the right and left outer wall portions 20 and the engaging elements 13 in the molded surface fastener 1 are formed, as a whole, of the first synthetic resin in which magnetic particles are substantially not contained.

The expression "the magnetic particles are substantially not contained" in the present invention includes not only a case that the part is formed only of synthetic resin without containing magnetic particles but also a case that the part is formed of synthetic resin containing magnetic particles at 10 wt % or lower, and preferably 5 wt % or lower. This is because the molded surface fastener of the present invention is sometimes manufactured including a process of recycling the products in order to reduce environmental burden in some cases.

For example, final products of a molded surface fastener partially including magnetic materials (magnetic particles) are shredded first and recycled to pellets for extrusion resin in which magnetic materials are not intentionally contained to mold a molded surface fastener. In this case, a little amount of magnetic materials is sometimes contained in the synthetic resin serving as a main material of the molded surface fastener. The present invention includes a molded surface fastener which is manufactured from such a recycled material.

Therefore, the expression "the part containing magnetic materials" in the specification means "a part containing magnetic materials (magnetic particles) at a ratio of 30 wt % or higher and 80 wt % or lower (preferably 40 wt % or higher and 70 wt % or lower)" in synthetic resin. The expression "the part substantially not containing magnetic materials" means "a part containing magnetic materials at a ratio of 10 wt % or lower (preferably 5 wt % or lower)" in synthetic resin.

In Embodiment 1, in particular, the first synthetic resin does not contain magnetic particles (magnetic materials) at all, and the concentration of the magnetic particles in the first synthetic resin is 0 wt %. On the other hand, the second synthetic resin contains magnetic particles at a concentration (ratio) of 50 wt %. Therefore, at an upper end part of the magnetic wall body 31 in Embodiment 1, magnetic particles are contained at a certain ratio of 50 wt %. In Embodiment 1, the concentration of magnetic particles in the second synthetic resin can be determined arbitrarily within a range between 30 wt % or higher and 80 wt % or lower.

In the magnetic wall portion 30 of Embodiment 1, it is also possible that the upper end part containing the magnetic particles at a certain high ratio is provided only on an extremely tiny area which is hard to be seen, or is provided from an upper end to a lower area in the magnetic wall portion 30 within a region of 50% or larger, further 80% or larger of a height dimension from the base portion 11 in the magnetic wall portion 30.

In each magnetic wall body 31 of Embodiment 1, a mixed area 35 that the first synthetic resin substantially not containing magnetic materials and the second synthetic resin containing the magnetic materials at a certain ratio are mixed is formed on an area between the upper end part of the magnetic wall body 31 and the base portion 11. A boundary part between the first synthetic resin and the second synthetic resin in each magnetic wall portion 31 is formed in a vague (unclear) shape which cannot be identified clearly.

Particularly in this case, each magnetic wall body 31 is formed such that a ratio of the second synthetic resin is gradually decreased as well as the ratio of the first synthetic resin is gradually increased from the upper end part of the magnetic wall body 31 toward the base portion 11. Therefore, a concentration of the magnetic materials in the magnetic wall body 31 is gradually decreased from the upper end part of the magnetic wall body 31 toward the base portion 11 (downward).

Further, when a cross-section perpendicular to the width direction of the magnetic wall body 31 is viewed, for example, and as schematically shown in FIG. 4, for example, the mixed area 35 of each magnetic wall body 31 is not provided front-rear symmetrically about a center line 38 in the length direction of the magnetic wall body 31, but is provided to be biased to one side in the length direction of the molded surface fastener 1, specifically toward the front of the machine direction (MD) so that an area of the mixed area 35 becomes large.

As the mixed area 35 of the first synthetic resin and the second synthetic resin is formed on each magnetic wall body 31 as mentioned above, adhesion of the first synthetic resin and the second synthetic resin in each magnetic wall body 31 can be significantly improved. In the present invention, it is also possible that the magnetic wall portion 30 is formed without forming the mixed area 35 so that a boundary between the first synthetic resin and the second synthetic resin can be identified.

Also, as the mixed area 35 as above is provided on the magnetic wall portion 30, a use amount of the magnetic particles used for the magnetic wall portion 30 can be reduced compared in a case the entire magnetic wall portion 30 is formed of the second synthetic resin only. Thereby, reduction of manufacturing cost can be exerted, and lowering of flexibility of the synthetic resin due to containing magnetic particles can be suppressed.

Further, on right and left sides of each magnetic wall portion 30 in the molded surface fastener 1 of Embodiment 1, a right and left pair of grooved channel portions 40 grooved on an upper surface part of the base portion 11 are disposed adjacent to the magnetic wall portion 30. That is, an inner grooved channel portion 41 is provided between a left end of the engaging area 14 and the left magnetic wall portion 30, and an outer grooved channel portion 42 is provided between the left outer wall portion 20 and the left magnetic wall portion 30, thereby on the left magnetic wall portion 30, a pair of the inner grooved channel portion 41 and the outer grooved channel portion 42 are provided to interpose the magnetic wall portion 30 therebetween. Also, an inner grooved channel portion 41 is provided between the right end of the engaging area 14 and the right magnetic wall portion 30, and an outer grooved channel portion 42 is provided between the right outer wall portion 20 and the right magnetic wall portion 30, thereby on the right magnetic wall portion 30, a pair of the inner grooved channel portion 41 and the outer grooved channel portion 42 are provided so as to interpose the magnetic wall portion 30 therebetween.

The grooved channel portions 40 provided corresponding to each magnetic wall portion 30 are formed linearly and continuously just beside the magnetic wall portions 30 along the length direction. In this case, the right and left grooved channel portions 40 (inner grooved channel portion 41 and outer grooved channel portion 42) are provided so that an inner wall surface and an outer wall surface of the magnetic wall body 31 in the magnetic wall portion 30 form the same flat surfaces as side wall surfaces near the magnetic wall portion 30 of the right and left grooved channel portions 40, respectively. Further, a height dimension from an upper surface of the base portion 11 to a channel bottom part of the grooved channel portion 40 in each grooved channel portion 40 (hereinafter, referred to as a channel depth dimension) has a constant size along an entire length direction.

Also in Embodiment 1, a pair of the right and left grooved channel portions 40 (inner grooved channel portion 41 and outer grooved channel portion 42) provided on the left magnetic wall portion 30, and a pair of the right and left grooved channel portions 40 (inner grooved channel portion 41 and outer grooved channel portion 42) provided on the right magnetic wall portion 30 have the same channel depth dimensions.

In this case, the channel depth dimension of each grooved channel portion 40 is 30% or larger and 70% or smaller of a dimension in the height direction from the upper surface to the lower surface of the base portion 11 (i.e. the thickness dimension), and preferably 40% or larger and 60% or smaller. The channel depth dimension of the grooved channel portion 40 in Embodiment 1, for example, is 50% of the thickness dimension of the base portion 11. Specifically, the thickness dimension of the base portion 11 is 0.3 mm and the channel depth dimension of the grooved channel portion 40 is 0.15 mm. In this case, the thickness dimension of a part on which the grooved channel portion 40 is provided on the base portion 11 is 0.15 mm (=0.30 mm-0.15 mm).

As the channel depth dimension of the grooved channel portion 40 is 30% or larger (preferably 40% or larger) of the thickness dimension of the base portion 11, as mentioned above, a thickness of a part on which the grooved channel portion 40 is provided on the base portion 11 can be thinner than other part. Therefore, when the molded surface fastener 1 is molded using the first synthetic resin and the second synthetic resin, it can be effectively suppressed (or prevented) that the magnetic particles contained in the second synthetic resin leak from the magnetic wall portion 30 formed of the second synthetic resin to an outside area on which the outer wall portion 20 is disposed or an inside area on which the lateral wall portion 15 and the engaging element 13 are disposed over the thin part of the base portion 11 on which the grooved channel portion 40 is formed. Therefore, the outer wall portion 20, the lateral wall portion 15 and a lot of (or entire) engaging element 13 can be formed of the first synthetic resin only.

On the other hand, as the channel depth dimension of the grooved channel portion 40 is 70% or smaller (preferably 60% or smaller) of the thickness dimension of the base portion 11, strength of the base portion 11 can be appropriately secured in spite of the grooved channel portion 40 being provided.

In Embodiment 1, it is preferable that the thickness dimension of a part on which the grooved channel portion 40 is provided on the base portion 11 (i.e. a difference between the thickness dimension of the base portion 11 and a channel depth dimension of the grooved channel portion 40) is 50% or larger and 150% or smaller of an average particle size of the magnetic particles to be contained in the second synthetic resin. By setting the thickness dimension of a part on which the grooved channel portion 40 is provided of the base portion 11 at 50% or larger of the average particle size of the magnetic particles, the strength of the base portion 11 can be appropriately secured.

Also by setting the thickness dimension of a part on which the grooved channel portion 40 of the base portion 11 at 150% or lower of the average particle size of the magnetic particles, it can be effectively suppressed (or prevented) that, at the time of molding the molded surface fastener 1, the magnetic particles contained in the second synthetic resin leak from the magnetic wall portion 30 over the thin part of the base portion 11 on which the grooved channel portion 40 is provided to an outside area on which the outer wall portion 20 is disposed and an inside area on which the lateral wall portion 15 and the engaging elements 13 are disposed.

Further in Embodiment 1, a pair of the inner grooved channel portion 41 and the outer grooved channel portion 42 disposed corresponding to each magnetic wall portion 30 are provided to have different dimensions of the grooved channel portion 40 in the width direction (hereinafter, referred to as the channel width dimension) from each other. Particularly in the case of Embodiment 1, the outer grooved channel portion 42 disposed at a position outside the magnetic wall portion 30 near the outer wall portion 20 is provided to have a larger width dimension than the inner grooved channel portion 41 disposed at a position inside the magnetic wall portion 30 near the engaging elements 13.

As the outer grooved channel portion 42 is formed to have a larger width dimension than the inner grooved channel portion 41, at the time of molding the molded surface fastener 1, the possibility of the magnetic particles contained in the second synthetic resin leaking from the magnetic wall portion 30 to the outside area disposed on which the outer wall portion 20 is disposed can be smaller than the possibility of the one leaking from the magnetic wall portion 30 to the inside area on which the lateral wall portion 15 and the engaging elements 13 are disposed. Further, as the inner grooved channel portion 41 is formed to have a smaller width dimension than the outer grooved channel portion 42, foam resin can be effectively prevented from intruding through a slit provided between the magnetic wall portion 30 and the lateral wall portion 15 at the time of foam molding a cushion body.

Right and left fin piece portions 17 in Embodiment 1 are extended outward in a tongue shape from the right side edge and the left side edge of the base portion 11, and the right fin piece portion 17 and the left fin piece portion 17 are disposed in a staggered manner in the length direction with predetermined pitches. These right and left fin piece portions 17 are a part to be buried inside the cushion body after foam molding of the cushion body, and is provided for enhancing the fixing strength of the molded surface fastener 1 to the cushion body. In the fin piece portion 17, protrusions may be provided to further enhance the fixing strength to the cushion body.

The molded surface fastener 1 of Embodiment 1 having the above-mentioned structures is manufactured using a molding apparatus 60 as shown in FIGS. 5 to 8, for example.

The molding apparatus 60 of Embodiment 1 has a die wheel 61 drive-rotating in one direction (anti-clockwise in the drawings), an extrusion nozzle 66 disposed to face a circumferential surface of the die wheel 61 and continuously discharging the first synthetic resin and the second synthetic resin separately, and a pickup roller 67 disposed on a downstream side of the extrusion nozzle 66 in the rotating direction of the die wheel 61.

Figure 6:
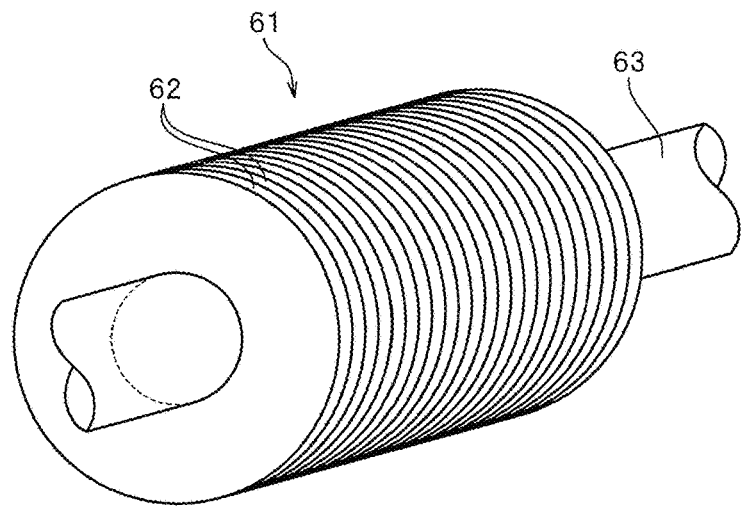
FIG. 6 is a schematic view illustrating an embodiment of a die wheel for molding the molded surface fastener.

The die wheel 61 of the molding apparatus 60 has a plurality of laminated plates 62 formed in a ring shape or a donut shape having a predetermined thickness and provided with a circular shaped opening at a center part, and a rotating shaft portion 63 passing through the center openings of the plurality of laminated plates 62 and fixing the laminated plates 62 as shown in FIG. 6.

The die wheel 61 is formed in a column shape such that the plurality of laminated plates 62 are layered serially in the rotating shaft direction of the die wheel 61 and fixed to the rotating shaft portion 63 in a laminated state. On an outer peripheral surface part of the die wheel 61 (i.e., an outer peripheral edge part of the laminated plates 62), a molding cavity (not shown in the drawings) for molding the outer wall portion 20, the engaging elements 13, the lateral wall portion 15 and the magnetic wall portion 30 of the molded surface fastener 1 is formed by using conventionally known technique such as electro-discharge machining, laser processing or etching processing.

Figure 8:
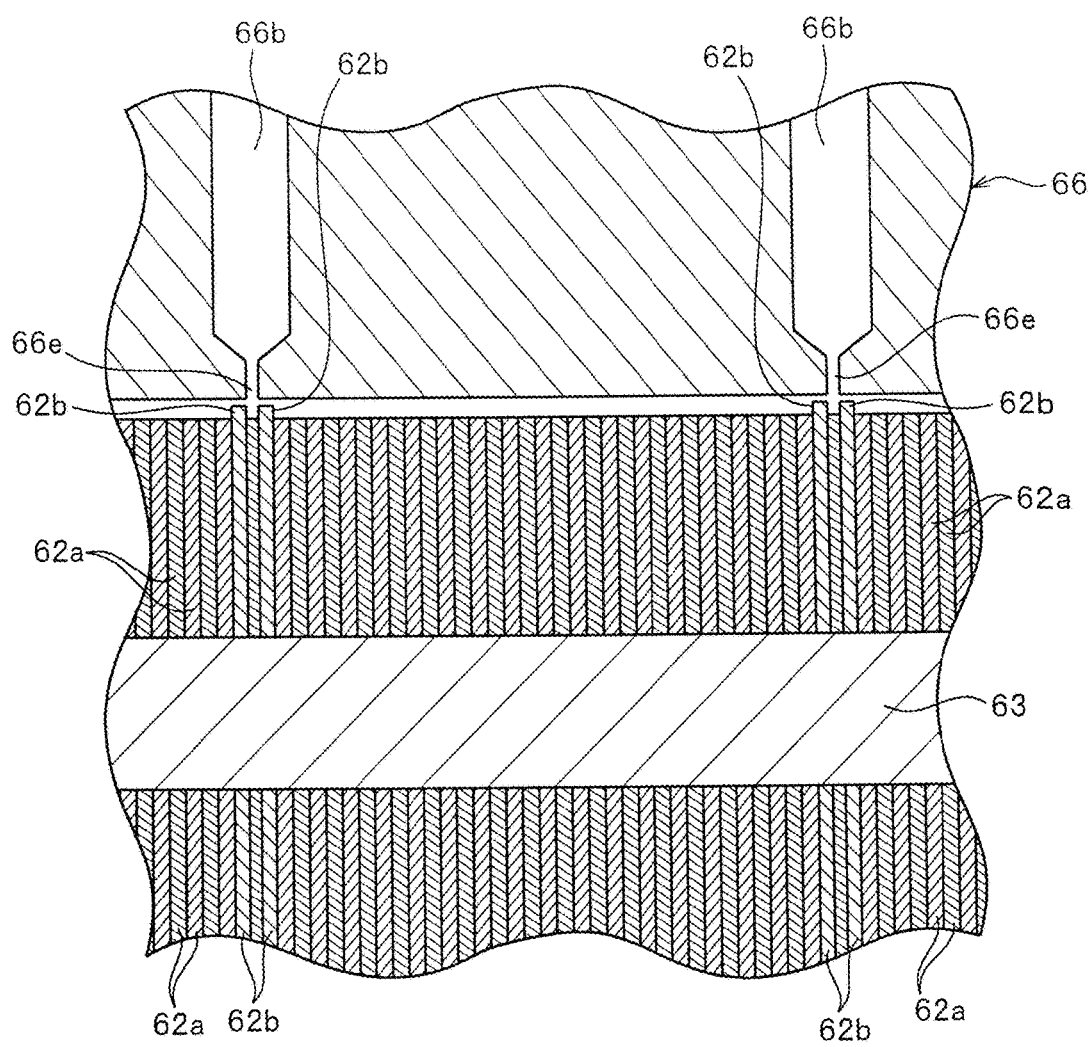
FIG. 8 is a schematic view illustrating a first laminated plate and a second laminated plate of a die wheel.

The laminated plate 62 forming the die wheel 61 of Embodiment 1 has a plurality of first laminated plates 62a having a constant dimension in the diameter direction from the rotating center to the outer peripheral surface (i.e., the radius length), and four plates of second laminated plates 62b having a constant dimension in the diameter direction from the rotating center to the outer peripheral surface and larger than the first laminated plate 62a, as schematically shown in FIG. 8.

Although the plurality of first laminated plates 62a are formed to have the same dimension in the rotating shaft direction (in other words, the same thickness dimension of the first laminated plate 62a) in FIG. 8, each laminated plate 62a may be formed to have required thickness dimensions corresponding to a position to be laminated.

The second laminated plate 62b of the die wheel 61 has a larger radius than the first laminated plate 62a by a size of a channel depth dimension of the grooved channel portion 40 formed on the right and left both sides of the magnetic wall portion 30 in the molded surface fastener 1. Two pieces of the second laminated plates 62b are arranged as a pair at a position in the die wheel 61 corresponding to a part forming a pair of the groove channel portions 40 (i.e., the inner grooved channel portion 41 and the outer grooved channel portion 42) in the molded surface fastener 1, and two pairs of the two second laminated plates 62b (i.e., four plates of the second laminated plates 62b) are used for the entire die wheel 61.

In this case, the pair of the second laminated plates 62b are layered to interpose one first laminated plates 62a having a thickness dimension corresponding to a width dimension of the magnetic wall portion 30 (dimension in the rotating shaft direction) between these second laminated plates 62b. The pair of the second laminated plates 62b are layered so that a second discharging outlet 66e, described later, of the extrusion nozzle 66 is disposed at a position between these second laminated plates 62b. The die wheel 61 is formed by laminating the pair of the second laminated plates 62b and the one first laminated plate 62a as above, thereby the molded surface fastener 1 provided with the grooved channel portions 40 on the right and left both sides of the magnetic wall portion 30 can be molded while the second synthetic resin containing magnetic particles is suppressed or prevented from leaking to the outer wall portion 20, the lateral wall portion 15 and the engaging elements 13.

Further, the die wheel 61 of Embodiment 1 is formed to be able to circulate coolant within the die wheel 61 (not shown in the drawings) for effectively cooling the molded surface fastener 1 molded along the outer peripheral surface. Below the die wheel 61, a coolant bath (not shown) is disposed to make a lower half part of the die wheel 61 immersed.

Figure 7:
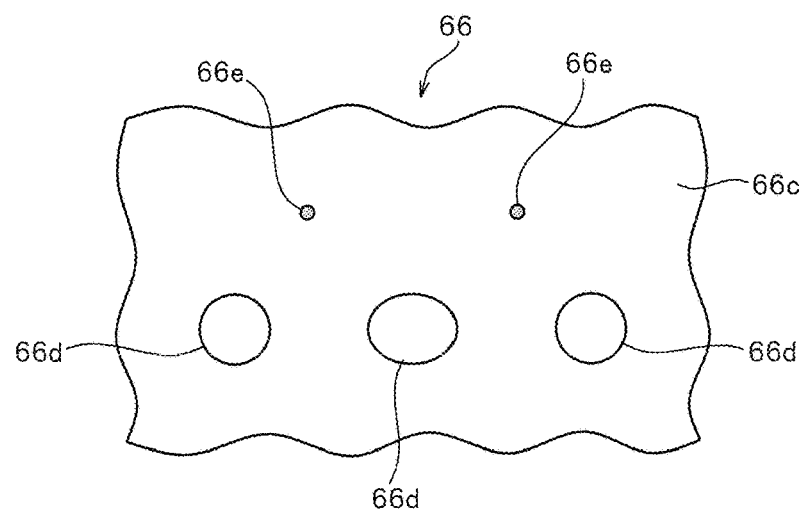
FIG. 7 is a schematic view illustrating a position relation of a discharging outlet of an extrusion nozzle disposed on the manufacturing apparatus.

In the extrusion nozzle 66, a first flow path 66a in which the first synthetic resin substantially not containing magnetic particles is flowed through in a molten state, and a second flow path 66b in which the second synthetic resin containing the magnetic particles at a certain concentration is flowed through in a molten state are formed. On a discharging surface 66c of the extrusion nozzle 66, three first discharging outlets 66d which discharge the first synthetic resin in a molten state, and two second discharging outlets 66e which discharge the second synthetic resin in a molten state are provided as shown in FIG. 7.

In this case, the three first discharging outlets 66d communicate with the first flow path 66a of the extrusion nozzle 66, and the two second discharging outlets 66e communicate with the second flow path 66b of the extrusion nozzle 66. The two second discharging outlets 66e are formed in a circular shape at a position above the three first discharging outlets 66d and between the first discharging outlet 66d at the center and the first discharging outlets 66d on the right and left sides to correspond to the positions on which the magnetic wall portions 30 of the molded surface fastener 1 is formed. In the present invention, the position, shape and size of the first discharging outlet 66d and the second discharging outlet 66e can be changed arbitrarily depending on the size and shape of the molded surface fastener 1 to be molded.

The pickup roller 67 of Embodiment 1 has an upper holding roller 67a and a lower holding roller 67b as a pair which hold the molded surface fastener 1 to be molded along the outer peripheral surface of the die wheel 61 from above and below. The upper holding roller 67a and the lower holding roller 67b of the pickup roller 67 are disposed to face each other.

The upper holding roller 67a and the lower holding roller 67b rotate respectively in predetermined directions at predetermined speed, thereby the molded surface fastener 1 molded on the outer peripheral surface part of the die wheel 61 can be continuously peeled off from the die wheel 61, and the peeled molded surface fastener 1 can be held between the upper holding roller 67*a* and the lower holding roller 67*b* to be transferred to the downstream side.

In manufacturing the molded surface fastener 1 using the molding apparatus as above, as the first step, molten first synthetic resin is injected continuously to the outer peripheral surface of the die wheel 61 from the three first discharging outlets 66*d* of the extrusion nozzle 66, as well as molten second synthetic resin is injected continuously to the outer peripheral surface of the die wheel 61 from the two second discharging outlets 66*e*.

At this time, the die wheel 61 is formed using a plurality of first laminated plates 62*a* and four second laminated plates 62*b* such that the second discharging outlets 66*e* of the extrusion nozzle 66 are arranged between the pair of two second laminated plates 62*b* as shown in FIG. 8. Therefore, the molten second synthetic resin is discharged from the second discharging outlet 66*e*, and the discharged second synthetic resin is accommodated between the pair of the second laminated plates 62*b* in the die wheel 61, thereby it can be suppressed (or prevented) that the second synthetic resin leaks over the pair of second laminated plates 62*b* to the area outside the second laminated plates 62*b* or the area inside the second laminated plates 62*b*.

Further, the second laminated plate 62*b* of the die wheel 61 is formed to have a larger radius than the first laminated plate 62*a*. Therefore, the groove channel portions 40 (inner grooved channel portion 41 and outer grooved channel portion 42) are formed on an upper surface part of the base portion 11 and on the right and left both sides of each magnetic wall portion 30 in the molded surface fastener 1 by the two pairs of second laminated plates 62*b* disposed in the die wheel 61, and the thickness of the base portion 11 at a part provided with the grooved channel portion 40 can be thin. At the time, a channel depth dimension of the grooved channel portion 40 to be formed corresponds to a difference between the radius in the first laminated plate 62*a* and in the second laminated plate 62*b* in the die wheel 61.

Then, two kinds of molten synthetic resin i.e. the first synthetic resin substantially not containing magnetic particles and the second synthetic resin containing the magnetic particles at a certain concentration are continuously extruded from the extrusion nozzle 66 as above, and as the die wheel is drive rotating in one direction as shown in FIG. 5, the two kinds of molten synthetic resin, i.e. the first synthetic resin and the second synthetic resin in a molten state discharged from the extrusion nozzle 66 are mixed at a boundary part and half-rotated while being held on the outer peripheral surface of the die wheel 61 to be cooled and cured.

At this time, the base portion 11 of the molded surface fastener 1 is formed of mainly the first synthetic resin between the extrusion nozzle 66 of the molding apparatus 60 and the die wheel 61. Further, by each cavity formed on the die wheel 61, at least each upper end part of the outer wall portion 20 of the molded surface fastener 1 is formed of the first synthetic resin only, and at least each upper end part of the magnetic wall portion 30 is formed of the second synthetic resin only.

In Embodiment 1 in particular, the outer wall portion 20, the engaging element 13 and the lateral wall portion 15 of the molded surface fastener 1 are formed of mainly the first synthetic resin integrally on the base portion 11. The upper end part of the magnetic wall portion 30 of the molded surface fastener 1 is formed of the second synthetic resin only, and an area between the upper end part of the magnetic wall portion 30 and the base portion 11 in the magnetic wall portion 30 is formed as a mixed area 35 of the first synthetic resin and the second synthetic resin mixed each other in a molten state and integrated.

As a result, the molded surface fastener 1 as shown in FIG. 1 is continuously molded on the outer peripheral surface of the die wheel 61 along the machine direction.

Thereafter, the molded surface fastener 1 which has been molded on the outer peripheral surface of the die wheel 61 and cooled is continuously peeled off from the die wheel 61 by the pickup roller 67. The molded surface fastener 1 peeled off from the die wheel 61 is introduced between the upper holding roller 67*a* and the lower holding roller 67*b* of the pickup roller 67 and transferred toward the downstream side.

At this time, the molded surface fastener 1 passes between the upper holding roller 67*a* and the lower holding roller 67*b* of the pickup roller 67, thereby each height dimension from the base portion 11 of the outer wall portion 20, engaging element 13, lateral wall portion 15 and magnetic wall portion 30 can be aligned the same stably.

Since magnetic particles are contained in the magnetic wall portion 30 of the molded surface fastener 1 to be molded, an outer surface of the magnetic wall portion 30 peeled off from the die wheel 61 tends to be formed as a surface having relatively large surface roughness. However, the molded surface fastener 1 just after being peeled off from the die wheel 61 passes between the upper holding roller 67*a* and the lower holding roller 67*b*, thereby the upper surface of the magnetic wall portion 30 is smoothed (flattened) by the outer peripheral surface of the upper holding roller 67*a*, which can make the surface roughness on the upper surface of the magnetic wall portion 30 smaller than the surface roughness of the inner wall surface or the outer wall surface of the magnetic wall portion 30 perpendicular to the width direction. Thus, the upper surface of the magnetic wall portion 30 is more glossy than the inner wall surface or the outer wall surface of the magnetic wall portion 30 perpendicular to the width direction, for example.

Thereafter, the molded surface fastener 1 after passing the pickup roller 67 is conveyed to a cutting part, for example, which is not shown in the drawings, and is cut in a predetermined length at the cutting part and collected, or the molded surface fastener 1 in a long state is rolled with a collecting roller and the like in a roll shape and collected.

It should be noted that in the present invention, a molding apparatus or a manufacturing method used for manufacturing the molded surface fastener 1 is not limited to the molding apparatus 60 or the manufacturing method described in Embodiment 1, and can be changed arbitrarily.

In Embodiment 1, for example, the molded surface fastener 1 is molded by continuously extruding molten first synthetic resin and second synthetic resin from the extrusion nozzle 66 toward an outer peripheral surface of one rotating die wheel 61. In the present invention, however, it is also possible that the molded surface fastener 1 is molded by using a pair of upper and lower molding rollers in which the die wheel 61 of Embodiment 1 is used as at least one of the pair, and continuously extruding molten first synthetic resin and second synthetic resin from the extrusion nozzle 66 toward between the upper and lower molding rollers.

In the molded surface fastener 1 of Embodiment 1 manufactured by performing the above-mentioned process, right and left magnetic wall portions 30 containing magnetic particles are formed separately from the right and left outer wall portions 20. Therefore, as a shape of the magnetic wall portion 30, a simple shape such that the second synthetic resin having lower flowability in a molten state is easy to be poured in a cavity can be adopted.

As a result, the right and left magnetic wall portions 30 can be stably molded in a predetermined shape using the die wheel 61. At the same time, it can be prevented (or suppressed) that the second synthetic resin (magnetic particles) leaks to the right and left outer wall portions 20, the engaging elements 13 and the lateral wall portions 15. Thereby, the right and left outer wall portions 20, the engaging elements 13 and the lateral wall portions 15 can be stably formed to have a predetermined shape and an appropriate strength.

Further, upper end parts of the right and left magnetic wall portions 30 of Embodiment 1 are formed of the second synthetic resin only. The upper surface of the magnetic wall portion 30 is flattened by the upper holding roller 67a of the pickup roller 67 as mentioned above, and the surface roughness of the upper surface of the magnetic wall portion 30 is made small. Therefore, when an imaging test is conducted to the molded surface fastener 1, the upper surface of the magnetic wall portion 30 can be shown clearly to be observed, and a contained state of the magnetic particles in the magnetic wall portion 30 can be easily and stably checked.

Further, as the upper surface of the magnetic wall portion 30 is formed to be flat, when the molded surface fastener 1 is held to the cavity surface of a molding die 70 described later using a magnetic force, the molded surface fastener 1 can be held at a flat cavity surface stably and the held state of the molded surface fastener 1 can be stably maintained.

In the magnetic wall portion 30, the mixed area 35 formed of the first synthetic resin and the second synthetic resin being mixed is formed, and adhesion of the first synthetic resin and the second synthetic resin is enhanced. Thereby, the strength of the magnetic wall portion 30 is enhanced, and the magnetic wall portion 30 can be less likely to be cracked or torn.

The molded surface fastener 1 of Embodiment 1 thus manufactured as above is suitably used for a cushion body (foam body) which is not shown in the drawings such as a passenger seat for an automobile. In this case, the molded surface fastener 1 is integrated at the time of foam molding of a cushion body so that a plurality of engaging elements 13 are exposed on a top surface of the cushion body.

Figure 9:
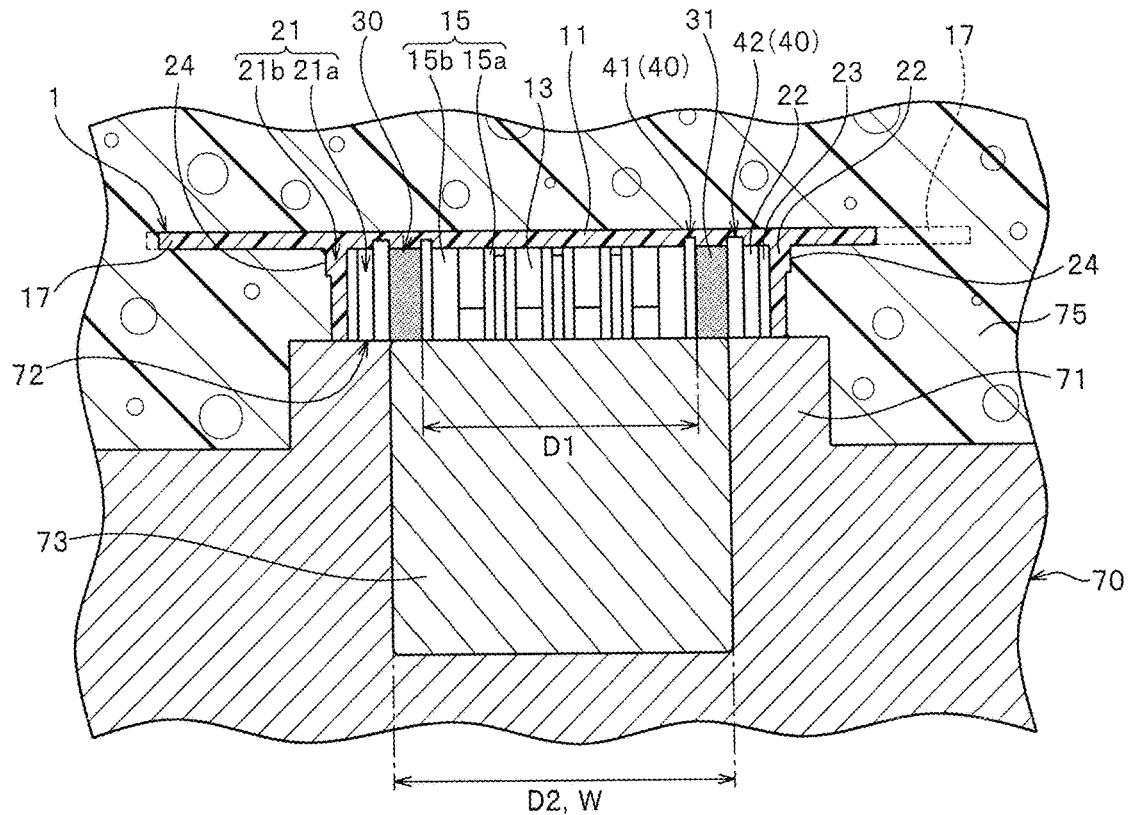
FIG. 9 is a cross-sectional view illustrating a state that the molded surface fastener is attached to a fastener attaching surface of the molding die and a cushion body is foam-molded.

In a case of manufacturing the cushion body to which the molded surface fastener 1 is integrated, as the first step, the molded surface fastener 1 in a long length is cut in a predetermined length, and the cut molded surface fastener 1 is placed on a fastener attaching surface (cavity surface) 72 of a fastener holding portion 71 provided in the molding die 70 for the cushion body as shown in FIG. 9.

In this case, a magnet 73 such as a neodymium magnet is mounted corresponding to a position at which the molded surface fastener 1 is placed. In the molding die 70 of Embodiment 1, the magnet 73 with a narrow width having a small dimension in the width direction of the molded surface fastener 1 is attached. The molded surface fastener 1 is placed on the fastener attaching surface 72 of the molding die 70 in a direction that the engaging elements 13 face the fastener attaching surface 72, thereby the molded surface fastener 1 is magnetically attracted and fixed to the fastener holding portion 71 of the molding die 70.

In the molded surface fastener 1 of Embodiment 1, the right and left magnetic wall portions 30 are arranged inside the right and left outer wall portions 20, and a distance between the right and left magnetic wall portions 30 is small. In this case, in particular, a distance D1 from the inner wall surface of the left magnetic wall portion 30 to the inner wall surface of the right magnetic wall portion 30 in the width direction is smaller than a width dimension W of the magnet 73 provided on the molding die 70. Therefore, although the magnet 73 of the molding die 70 is formed to be narrow as mentioned above, when both of the right and left magnetic wall portions 30 are arranged to face the magnet 73 of the molding die 70, both upper surfaces of the right and left magnetic wall portions 30 can be stably contacted with the magnet 73. Thus, the right and left magnetic wall portions 30 can be magnetically attracted simultaneously with one magnet 73, thereby the molded surface fastener 1 can be stably fixed to the fastener attaching surface 72 of the molding die 70 without having a position displacement. Further in this case, a distance D2 between the outer wall surfaces of the right and left magnetic wall portions 30 has the same size as the width dimension W of the magnet 73.

In Embodiment 1, as long as the distance D1 between the inner wall surfaces of the right and left magnetic wall portions 30 is smaller than the width dimension W of the magnet 73, and at least a part of the upper surface of the right and left magnetic wall portions 30 can contact with the magnet 73, the distance D2 can be larger than the width dimension W of the magnet 73.

Further, in Embodiment 1, each upper end part of the right and left magnetic wall portions 30 is formed of the second synthetic resin only which contains magnetic particles, and the magnetic particles are dispersed with a certain high concentration at the upper end part of the magnetic wall portions 30. Therefore, the molded surface fastener 1 can be attracted more strongly by the magnet 73 of the molding die 70, and the molded surface fastener 1 can be stably and firmly fixed to the fastener attaching surface 72 of the fastener holding portion 71. In addition, by utilizing the strong magnetic force between the magnetic particles of the molded surface fastener 1 and the magnet 73 of the molding die 70, a position and a direction of the molded surface fastener 1 with respect to the fastener holding portion 71 of the molding die 70 can be accurately and automatically adjusted corresponding to a position and a direction of the magnet 73.

Further, in the molded surface fastener 1 of Embodiment 1, the magnetic wall bodies 31 of the magnetic wall portion 30 are intermittently disposed along the length direction, thereby the molded surface fastener 1 has moderate flexibility as mentioned above, and the molded surface fastener 1 can be easily curved in an upper and lower direction. Therefore, even when the fastener attaching surface 72 of the fastener holding portion 71 of the molding die 70 is formed in a curved surface shape along the length direction of the molded surface fastener 1, for example, the molded surface fastener 1 can be appropriately curved along the curved shape of the cavity surface of the molding die 70 and attached to the cavity surface without having a large gap between the both.

Thus, the molded surface fastener 1 of Embodiment 1 can be stably held on the fastener holding portion 71 of the molding die 70 in a state that the upper surfaces of the right and left outer wall portions 20, the upper surfaces of the lateral wall portions 15 and the upper end parts of the engaging elements 13 are adhered to the fastener attaching surface 72 of the molding die 70 in an entire length direction of the molded surface fastener 1.

Then, after the molded surface fastener 1 is attracted and held on the fastener holding portion 71 of the molding die 70, foam resin of a cushion body is injected into a cavity space of the molding die 70. Thereby the foam resin flows while foaming to a lower surface (back surface) side of the base portion 11, an outside of the right and left outer wall portions 20 of the molded surface fastener 1, and front and rear end edges of the molded surface fastener 1, and spreads to the entire cavity space of the molding die 70 to foam molding the cushion body (foam body) 75 as shown in FIG. 9. At this time, the molded surface fastener 1 is positioned and fixed at a predetermined position by the attracting function of the magnet 73 of the molding die 70, thereby the position of the molded surface fastener 1 is not moved by the flow or the foaming pressure of the foam resin.

Furthermore, in the molded surface fastener 1 of Embodiment 1, each of the right and left outer wall portions 20 is continuously formed in a meandering shape serially, and is adhered to the cavity surface of the molding die 70. Therefore, it can be prevented that the foam resin flowing within the cavity space of the molding die 70 is intruded into the engaging area 14 from the width direction over the right and left outer wall portions 20.

Even when the foam resin flows from the end part of the molded surface fastener 1 in the front and rear direction along the length direction toward the engaging area 14, for example, a plurality of the lateral wall portions 15 and a plurality of the engaging elements 13 which are disposed along the width direction at the closest to the front end or at the closest to the rear end of the molded surface fastener 1 are provided entirely between the right and left magnetic wall portions 30 in a state of being adhered to the cavity surface of the molding die 70. Further, the magnetic wall portion 30 and the outer wall portion 20 are disposed to be close to each other.

Therefore, although the foam resin flowing along the length direction enters from the front end edge and the rear end edge of the molded surface fastener 1 into a position at which the first lateral wall portions 15 and the first engaging elements 13 are disposed, it can be prevented from intruding into the engaging area 14 over these lateral wall portions 15 and the engaging elements 13. That is, in the molded surface fastener 1 of Embodiment 1, it can be prevented that the foam resin for the cushion body 75 is intruded from the width direction or the length direction of the molded surface fastener 1 into the engaging area 14, and stably prevented that the engaging elements 13 are buried by the foam resin of the cushion body 75.

Thus, when the foam resin is foam-cured and the foam molding is completed, the cushion body 75 on which the molded surface fastener 1 is fixed at a required position is manufactured. In the cushion body 75 thus obtained, the foam body is not intruded into the engaging area 14 of the molded surface fastener 1, and an engaging force which is inherently provided on the engaging element 13 can be stably secured.

Accordingly, the surface of the obtained cushion body 75 is covered with a skin material, thereby loop-shaped engaging elements provided on the back surface of the skin material can be easily engaged with the hook-shaped engaging elements 13 of the molded surface fastener 1. Thereby, the skin material can be adhered and accurately attached along a curved surface of the top surface of the cushion body 75 without floating from the cushion body 75.

Further in this case, the molded surface fastener 1 of Embodiment 1 is excellent in flexibility in the upper and lower direction. Therefore, when the skin material is pulled so as to be separated from the molded surface fastener 1, for example, the molded surface fastener 1 keeping the engaging state with the loop-shaped engaging elements of the skin material is easily curved in the pulled direction together with the cushion body 75, and the loop-shaped engaging elements of the skin material are less likely to be disengaged from the hook-shaped engaging elements 13 of the molded surface fastener 1. As a result, the engaging strength of the molded surface fastener 1 with respect to the loop-shaped engaging elements of the skin material is enhanced.

In Embodiment 1, the magnetic wall bodies 31 of the magnetic wall portion 30 are intermittently disposed with predetermined pitches along the length direction, as mentioned above, and the forming pitch of the length direction of the magnetic wall bodies 31 is as the same as the forming pitch in the length direction of the engaging elements 13 (see FIG. 4).

In the magnetic wall portion of the present invention, however, the length dimension of each magnetic wall body, the distance between the magnetic wall bodies, the forming pitch in the length direction of the magnetic wall bodies, and the like can be arbitrarily changed. For example, as a molded surface fastener 1a according to a modification example of Embodiment is shown in FIG. 10, it is also possible that the length dimension of each magnetic wall body 31a in a magnetic wall portion 30a is smaller than in a case of Embodiment 1 as well as the forming pitch in the length direction of the magnetic wall body 31a is smaller than in the case of Embodiment 1.

Figure 10:
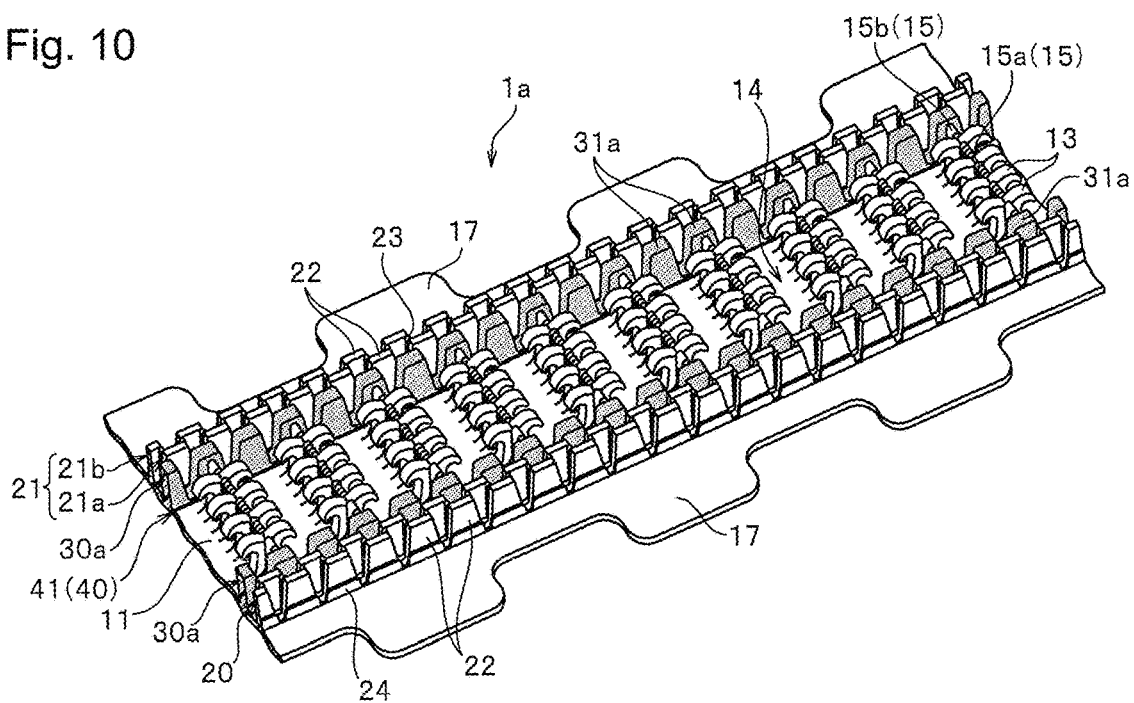
FIG. 10 is a perspective view illustrating the molded surface fastener according to a modified example of Embodiment 1.

In the molded surface fastener 1a according to the modification example as shown in FIG. 10, a shape of the magnetic wall portion 30a is formed differently from the one of the molded surface fastener 1 of Embodiment 1. However, other part except the magnetic wall portion 30a is formed to be substantially the same as the molded surface fastener 1 of Embodiment 1. Accordingly, in the modification example or in Embodiment 2 and Embodiment 3, described later, parts or members having substantially same shape or dimension as those of the molded surface fastener 1 according to Embodiment 1 as above are represented with the same reference signs and will not be explained.

In the molded surface fastener 1a according to the modification example, each magnetic wall portion 30a is provided at a position between the outer wall portion 20 and the engaging area 14 in the width direction along the length direction. Each magnetic wall portion 30a has a plurality of magnetic wall bodies 31a disposed in a row along the length direction. The plurality of magnetic wall bodies 31a in each magnetic wall portion 30a are intermittently disposed having predetermined forming pitches, and a predetermined gap is provided between two magnetic wall bodies 31a disposed adjacently in the length direction.

The length dimension (dimension in the length direction) of each magnetic wall body 31a in the modification example is smaller than a half size of the length dimension of the magnetic wall body 31 in the above-mentioned Embodiment 1. The forming pitch in the length direction of the magnetic wall body 31a is a half size of the forming pitch in the length direction of the engaging element 13. A width dimension of each magnetic wall body 31a and a height dimension from the upper surface of the base portion 11 are the same as those of the magnetic wall body 31 in Embodiment 1 as mentioned above.

Also in each magnetic wall body 31a in the modification example, magnetic particles are contained as same as the magnetic wall body 31 of the above-mentioned Embodiment 1. That is, at least an upper end part of the magnetic wall body 31a is formed of the second synthetic resin only, and the magnetic particles are contained at 50 wt % concentration at the upper end part of the magnetic wall portion 30a.

Since the magnetic wall portion 30a is formed of the plurality of magnetic wall bodies 31a as above, the molded surface fastener 1a of the modification example is easier to be bent in the upper and lower direction than the molded surface fastener 1 of Embodiment 1 as above, which more improves flexibility of the molded surface fastener 1a. Other than flexibility, the molded surface fastener 1a of the modification example can obtain substantially the same effects as the molded surface fastener 1 of Embodiment 1 as above.

Embodiment 2

Figure 11:
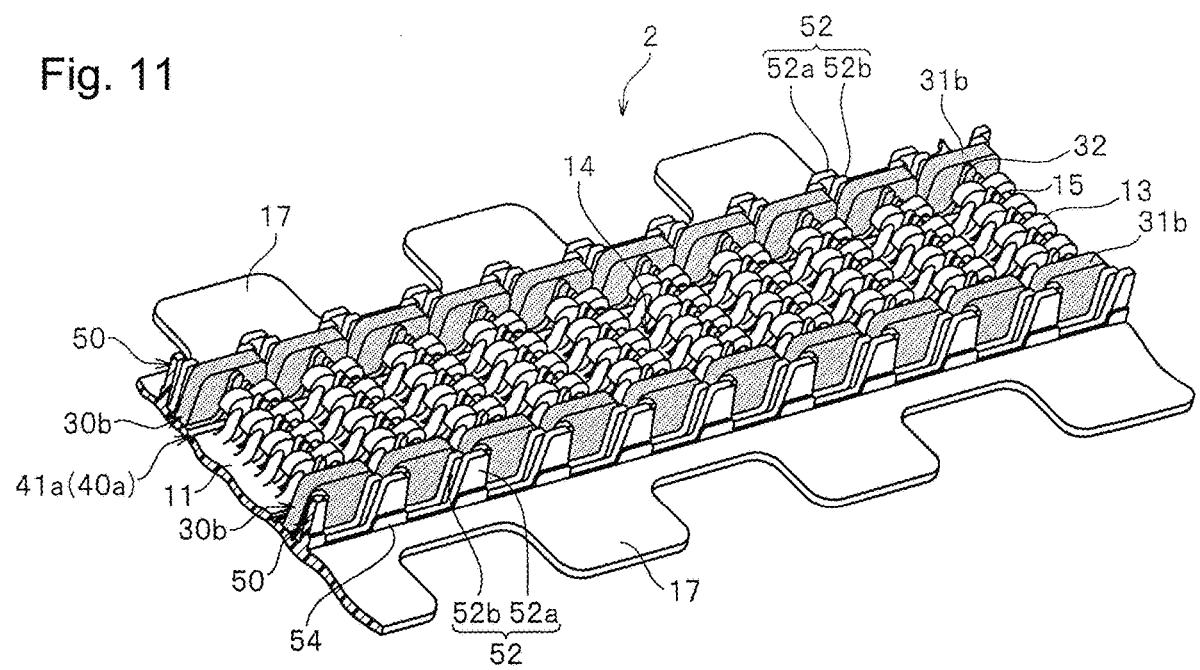
FIG. 11 is a perspective view illustrating a molded surface fastener according to Embodiment 2 of the present invention.
Figure 12:
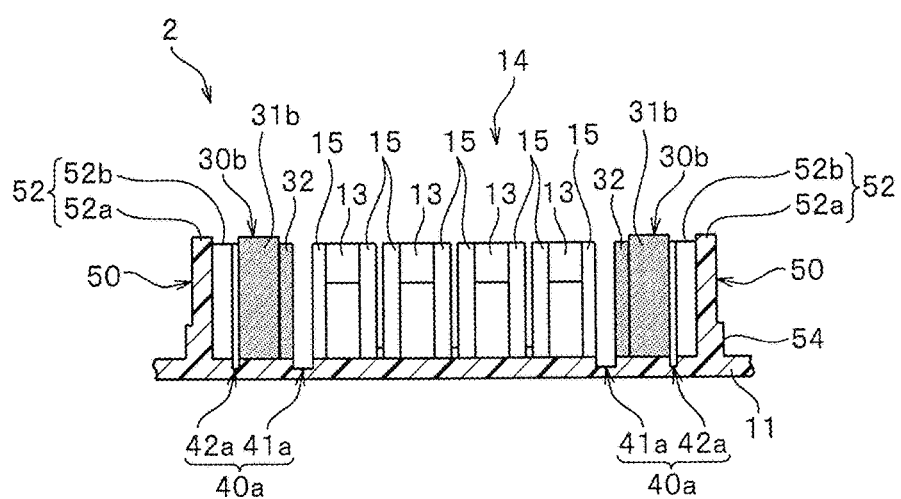
FIG. 12 a cross-sectional view of the molded surface fastener.

FIG. 11 is a perspective view illustrating a molded surface fastener according to Embodiment 2. FIG. 12 is a cross-sectional view of a cross-section perpendicular to the length direction of the molded surface fastener.

A molded surface fastener 2 of Embodiment 2 has a base portion 11 in a thin plate shape and long in the front and rear direction, right and left outer wall portions 50 standing on the right and left side edge parts of the base portion 11, a plurality of engaging elements 13 disposed between the right and left outer wall portions 50, the lateral wall portion 15 disposed along the right and left direction, right and left magnetic wall portions 30b disposed adjacent to an inside of the outer wall portion 50, and the fin piece portion 17 extending outward in the width direction from the right and left side edges of the base portion 11.

In the molded surface fastener 2 of Embodiment 2, a shape of the right and left outer wall portions 50, a shape of the right and left magnetic wall portions 30b and a shape of a grooved channel portion 40a, described later, are different from those in the molded surface fastener 1 of Embodiment 1 as above. However, part other than the outer wall portion 50 and the magnetic wall portion 30b are formed as substantially same as the molded surface fastener 1 of Embodiment 1 as above.

The right and left outer wall portions 50 in Embodiment 2 together with the magnetic wall portions 30b form resin-intrusion-preventing portions which prevent foam resin from intruding into the engaging area 14 at the time of foam molding of a cushion body.

In Embodiment 2, each of the right and left outer wall portions 50 has a plurality of divided vertical wall portions 52 intermittently disposed at predetermined forming pitches along the length direction, and a reinforcement portion 54 provided on the outer wall surface side of the divided vertical wall portion 52. In this case, the forming pitch of the divided vertical wall portion 52 is as same as the forming pitch in the length direction of the engaging element 13.

Each divided vertical wall portion 52 has a vertical wall main body portion 52a disposed outside in the width direction, and a front and rear pair of auxiliary vertical wall portions 52b integrally disposed inside the vertical wall main body portion 52a, and the reinforcement portion 54 is integrally provided to the vertical wall main body portion 52a. The vertical wall main body portion 52a is disposed, regarding the length direction, to correspond to a position of a gap between magnetic wall bodies 31b in the magnetic wall portion 30b. That is, when the molded surface fastener 2 is viewed from the right and left side-direction side, the vertical wall main body portion 52a of the outer wall portion 50 is disposed to cover over the gap between the magnetic wall bodies 31b of the magnetic wall portion 30b.

A height dimension of the vertical wall main body portion 52a from the upper surface of the base portion 11 is slightly larger than each height dimension of the engaging element 13 and the lateral wall portion 15 from the upper surface of the base portion 11. In this case, a difference between the height dimension of the vertical wall main body portion 52a and each height dimension of the engaging element 13 and the lateral wall portion 15 is small to the degree that foam resin of a cushion body cannot pass through.

The front and rear pair of the auxiliary vertical wall portions 52b in the divided vertical wall portion 52 are disposed between the vertical wall main body portion 52a and the magnetic wall portion 30b in the width direction. The auxiliary vertical wall portion 52b is formed to connect the vertical wall main body portion 52a and to be apart from the magnetic wall body 31b. When the molded surface fastener 2 is viewed from the right and left side-direction side, the front and rear pair of auxiliary vertical wall portions 52b are formed to partially overlap the vertical wall main body portion 52a and extend from the vertical wall main body portion 52a in the front and rear direction. At least a part of the part of the auxiliary vertical wall portion 52b which extend from the vertical wall main body portion 52a in the front and rear direction is disposed to overlap the magnetic wall body 31b when the molded surface fastener 2 is viewed from the right and left side-direction side. A height dimension of the auxiliary vertical wall portion 52b from the upper surface of the base portion 11 is as same as each height dimension of the engaging element 13 and the lateral wall portion 15 from the upper surface of the base portion 11.

Each of the right and left magnetic wall portions 30b in Embodiment 2 is provided along the length direction at a position between the outer wall portion 50 and the engaging area 14 in the width direction. Each magnetic wall portion 30b has a plurality of magnetic wall bodies 31b disposed to line in a row along the length direction and an auxiliary magnetic wall portion 32 formed inside the magnetic wall body 31b. The plurality of magnetic wall bodies 31b in the magnetic wall portion 30b are intermittently disposed having predetermined forming pitches as same as the magnetic wall portion 30 of Embodiment 1, and a predetermined gap is provided between the two magnetic wall bodies 31b disposed adjacent in the length direction.

Each magnetic wall body 31b is formed such that a height dimension of the magnetic wall body 31b from the upper surface of the base portion 11 is same as a height dimension of the vertical wall main body portion 52a from the upper surface of the base portion 11, in other words, is formed to be slightly larger than each height dimension of the engaging element 13 and the lateral wall portion 15 from the upper surface of the base portion 11.

The magnetic wall body 31b of Embodiment 2 is formed as same as the magnetic wall body 31 in Embodiment 1 as above except that the height dimension from the upper surface of the base portion 11 is different. Further in this case, a width dimension of the magnetic wall body 31b is larger than a width dimension of the vertical wall main body portion 52a of the outer wall portion 50, and is larger than a width dimension of the auxiliary vertical wall portion 52b of the outer wall portion 50. In addition, it is preferable that the width dimension of the magnetic wall body 31b is larger than the width dimension of the sum of the vertical wall main body and the auxiliary vertical wall portion 52b of the outer wall portion 50.

The auxiliary magnetic wall portion 32 provided on the magnetic wall portion 30b of Embodiment 2 is formed to connect the magnetic wall body 31b. The auxiliary magnetic wall portion 32 is disposed at the same position as the position of the lateral wall portion 15 regarding the length direction, and is formed such that a cross-section perpendicular to the width direction of the auxiliary magnetic wall portion 32 has a cross-sectional shape as same as that of a cross-section perpendicular to the width direction of the lateral wall portion 15. Therefore, a height dimension of the auxiliary magnetic wall portion 32 from the upper surface of the base portion 11 is the same size as each height dimension of the engaging element 13 and the lateral wall portion 15 from the upper surface of the base portion 11 although smaller than the height dimension of the magnetic wall body 31b from the upper surface of the base portion 11.

Magnetic particles are contained in the magnetic wall body 31b and the auxiliary magnetic wall portion 32 of the magnetic wall portion 30b in Embodiment 2. In this case, each upper end part of the magnetic wall body 31b and the auxiliary magnetic wall portion 32 is formed of the second synthetic resin only, and the magnetic particles are contained at a certain concentration (50 wt %, for example) within a range of 30 wt % or higher and 80 wt % or lower at each upper end part of the magnetic wall portion 30b and the auxiliary magnetic wall portion 32.

The magnetic wall body 31b and the auxiliary magnetic wall portion 32 have a mixed area formed of the first synthetic resin and the second synthetic resin being mixed, and the mixed area is formed in an area between the upper end parts of the magnetic wall body 31b and the auxiliary magnetic wall portion 32 and the base portion 11. Therefore, adhesion of the first synthetic resin and the second synthetic resin in the magnetic wall body 31b and the auxiliary magnetic wall portion 32 can be significantly improved.

In this case, the magnetic wall body 31b and the auxiliary magnetic wall portion 32 are formed such that a ratio of the second synthetic resin is gradually decreased while a ratio of the first synthetic resin is gradually increased from these upper end parts toward the base portion 11. Therefore, the concentration of the magnetic material in the magnetic wall body 31b and the auxiliary magnetic wall portion 32 is gradually decreased from the upper end part of the magnetic wall body 31b downward.

Further, on both of the right and left sides of each magnetic wall portion 30b of the molded surface fastener 2 in Embodiment 2, a right and left pair of grooved channel portions 40a grooved on the upper surface part of the base portion 11 are linearly and continuously formed along the length direction. In each magnetic wall portion 30b in this case, one set of an inner grooved channel portion 41a and an outer grooved channel portion 42a is provided as the grooved channel portions 40a, so as to interpose the magnetic wall portion 30b therebetween. The grooved channel portions 40a of Embodiment 2 have a channel depth dimension as same as the grooved channel portion 40 in Embodiment 1 as above.

In Embodiment 2, the inner grooved channel portion 41a and the outer grooved channel portion 42a disposed corresponding to each magnetic wall portion 30b are provided having different channel width dimensions from each other. In this case, the outer grooved channel portion 42a is provided to have a smaller width dimension than the inner grooved channel portion 41a.

As above, the outer grooved channel portion 42a is provided having the smaller width dimension than the inner grooved channel portion 41a, thereby it can be effectively prevented that at the time of foam molding a cushion body, foam resin is intruded through a gap between the outer wall portion 50 and the magnetic wall portion 30b (a gap formed to correspond to the outer grooved channel portion 42a). Further, as the inner grooved channel portion 41a is provided to have a larger width dimension than the outer grooved channel portion 42a, it can be effectively suppressed or prevented that at the time of molding the molded surface fastener 2, magnetic particles contained in the second synthetic resin leak from the magnetic wall portion 30b and are mixed to the lateral wall portion 15 and the engaging element 13.

The molded surface fastener 2 of Embodiment 2 as above is manufactured using the molding apparatus 60 having the die wheel 61 as shown in FIGS. 5 to 8. In this case, although the die wheel 61 has a plurality of the first laminated plates 62a and the four second laminated plates 62b as in the case of Embodiment 1 as above, a thickness of the first laminated plates 62a and the second laminated plates 62b are different from the case of the above Embodiment 1, and a shape of a molding cavity for molding the outer wall portion 50 and the magnetic wall portion 30b in the molded surface fastener 2 is different. In Embodiment 2, a process of manufacturing the molded surface fastener 2 using the molding apparatus 60 is substantially the same as in the case of the above Embodiment 1.

As same as the molded surface fastener 1 of Embodiment 1 as above, the right and left magnetic wall portions 30b containing magnetic particles are separately formed from the right and left outer wall portions 50 in the molded surface fastener 2 of Embodiment 2. Therefore, as a shape of the magnetic wall portion 30b, a simple shape for easily pouring the second synthetic resin can be adopted. Further, at least an upper end part of the right and left magnetic wall portions 30b is formed of the second synthetic resin only, and the upper surface of the magnetic wall portion 30b is formed to have decreased surface roughness by being flattened by the upper holding roller 67a of the pickup roller 67. Accordingly, the molded surface fastener 2 of Embodiment 2 can obtain the same effects as those in the molded surface fastener 1 of the above Embodiment 1.

Furthermore, the molded surface fastener 2 of Embodiment 2 is suitably used for a cushion body (foam body) which is not shown in the drawings for passenger seats for automobile and the like, as in the molded surface fastener 1 of Embodiment 1 as above. The cushion body is foam molded using the molded surface fastener 2 of Embodiment 2 as same as in the above Embodiment 1, thereby a high-quality cushion body on which the molded surface fastener 2 is integrated and the foam body is not intruded into the engaging area 14 of the molded surface fastener 2 can be stably manufactured.

Embodiment 3

Figure 13:
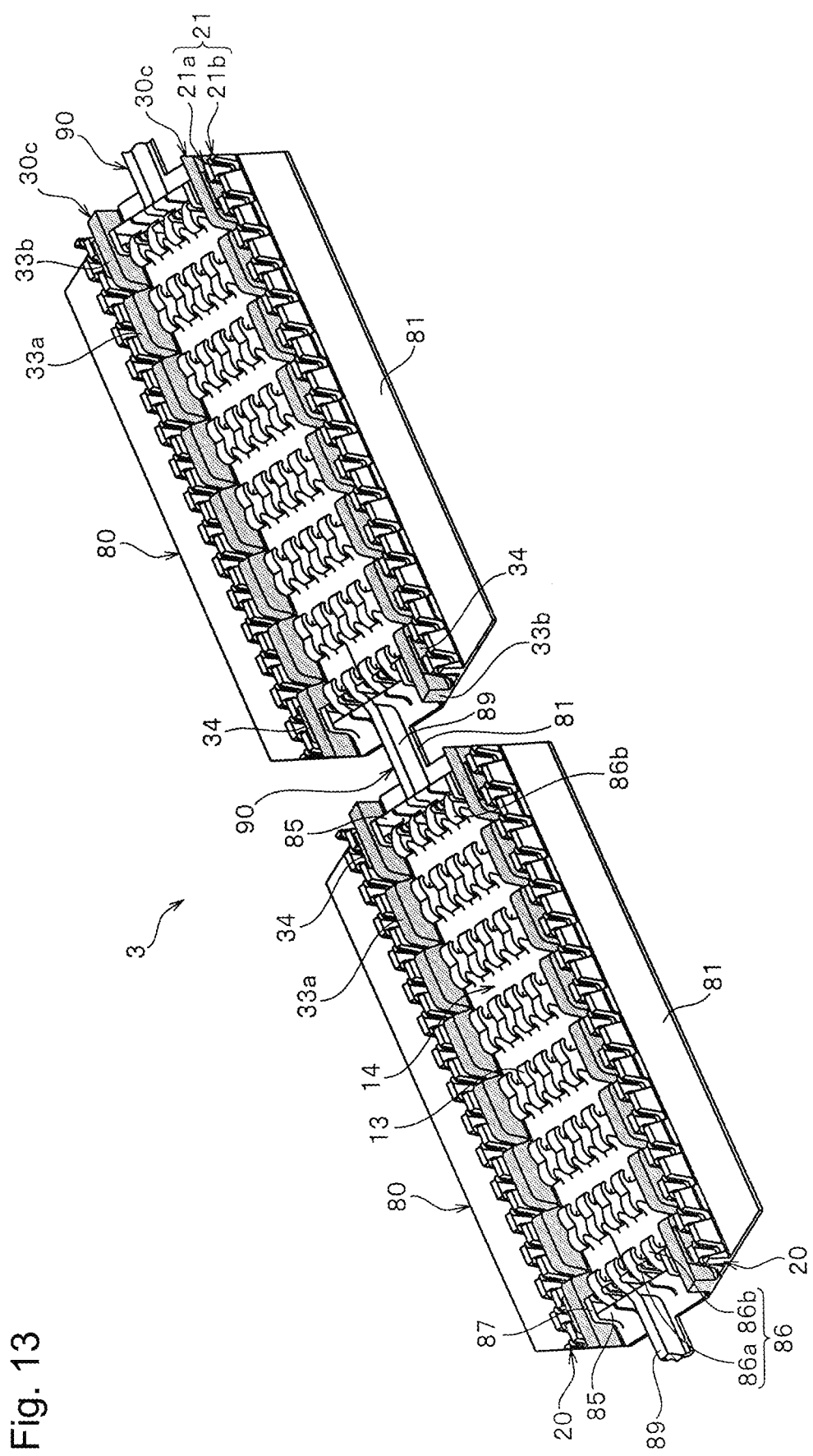
FIG. 13 is a perspective view illustrating a molded surface fastener according to Embodiment 3 of the present invention.
Figure 14:
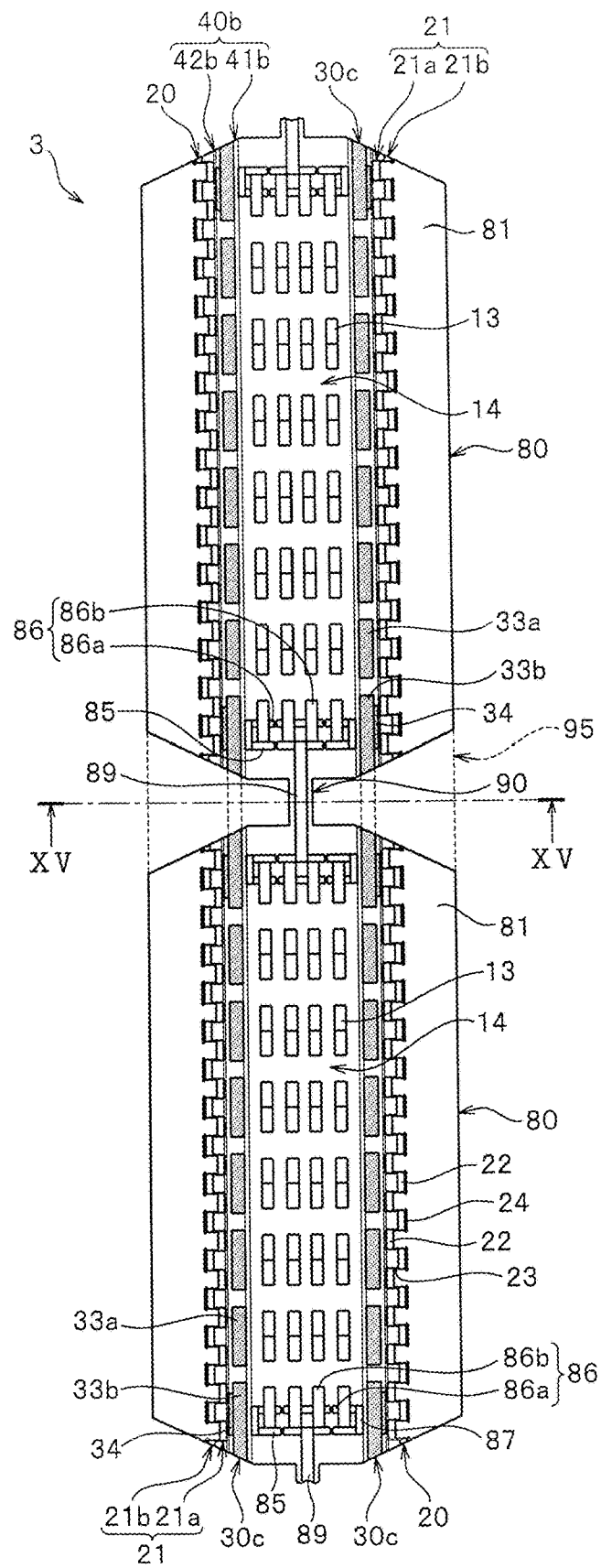
FIG. 14 is a plan view of the molded surface fastener.
Figure 15:
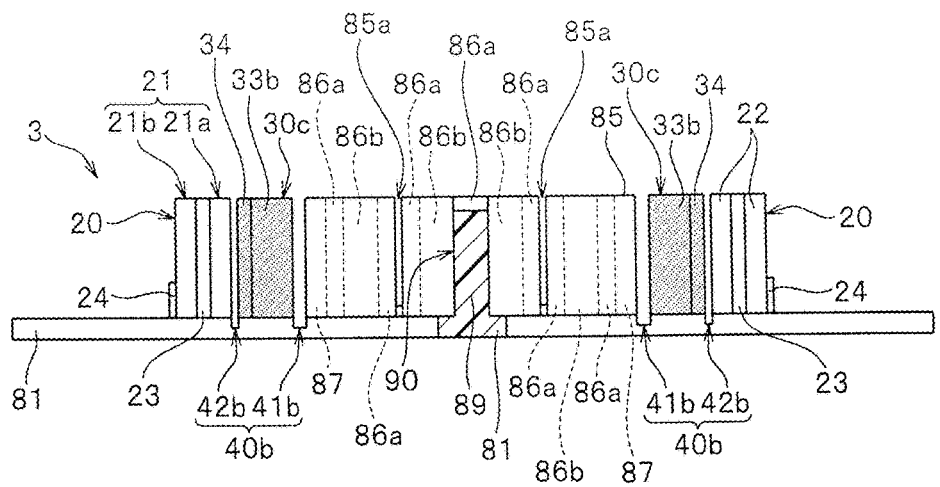
FIG. 15 is a cross-sectional view in XV-XV line shown in FIG. 14.
Figure 16:
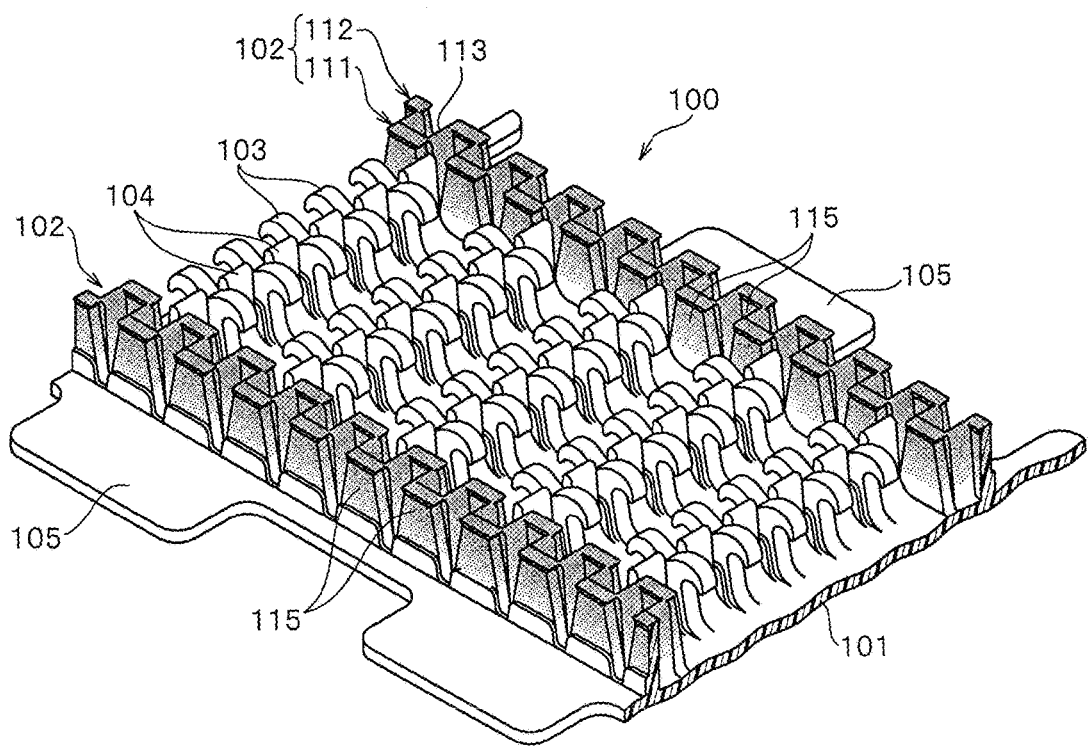
FIG. 16 is a perspective view illustrating a conventional molded surface fastener.

FIG. 13 is a perspective view illustrating a molded surface fastener according to Embodiment 3, and FIG. 14 is a plan view of the molded surface fastener. FIG. 15 is a cross-sectional view in XV-XV line shown in FIG. 14.

The molded surface fastener 3 of Embodiment 3 is formed able to be easily curved in the width direction. The molded surface fastener 3 has a plurality of surface fastener portions 80 disposed along the length direction at predetermined intervals and a connecting portion 90 provided with flexibility for connecting the adjacent surface fastener portions 80.

Each surface fastener portion 80 of Embodiment 3 has a base portion 81 in a thin plate shape, the right and left outer wall portions 20 standing on right and left side edge parts of the base portion 81, a plurality of engaging elements 13 disposed between the right and left outer wall portions 20, right and left magnetic wall portions 30c disposed adjacent to an inside of the right and left outer wall portions 20 and containing magnetic particles, a front and rear pair of main lateral wall portions 85 disposed along the width direction at a front end part and a rear end part of each surface fastener portion 80, a front and rear pair of auxiliary lateral wall portions 86 disposed along the width direction adjacent to an inside of each main lateral wall portion 85, and a protruded rib portion 89 protruded at a center part in the width direction on the upper surface of the base portion 81 and extending outward in the length direction from the main lateral wall portion 85.

The base portion 81 of the surface fastener portion 80 in Embodiment 3 is formed in a thin plate shape having small thickness dimension in the upper and lower direction. The base portion 81 of the surface fastener portion 80 has a left side edge and a right side edge parallel to the length direction, a front end edge and a rear end edge parallel to the width direction, and an oblique end edge diagonally disposed with respect to the length direction and the width direction between the right and left side edges and the front and rear end edges, and has an octagon shape in a plan view of the molded surface fastener 3.

The right and left outer wall portions 20 and each engaging element 13 of the surface fastener portion 80 in Embodiment 3 are formed substantially as same as the right and left outer wall portions 20 and the engaging element 13 disposed in the molded surface fastener 1 of Embodiment 1 as above, respectively. In each surface fastener portion 80, the engaging area 14 formed of a plurality of the engaging elements 13 is provided between the right and left outer wall portions 20.

The right and left magnetic wall portions 30c in Embodiment 3 are provided along the length direction at a position between the outer wall portion 20 and the engaging area 14 in the width direction. Each magnetic wall portion 30c has a plurality of first magnetic wall bodies 33a disposed to line in a row along the length direction in the center area in the length direction of the surface fastener portion 80, a second magnetic wall body 33b disposed along the length direction at the front end part and the rear end part in the length direction of the surface fastener portion 80, and an auxiliary magnetic wall portion 34 formed on an outside of the second magnetic wall body 33b.

Each first magnetic wall body 33a in Embodiment 3 is formed as substantially the same as the magnetic wall body 31 disposed on the molded surface fastener 1 in Embodiment 1 as above. The second magnetic wall body 33b in Embodiment 3 is disposed at the front end part and the rear end part of the surface fastener portion 80, and is formed to have a larger length dimension than the first magnetic wall body 33a.

In this case, between the first magnetic wall body 33a and the second magnetic wall body 33b, a gap is provided as same as the gap provided between the two first magnetic wall bodies 33a disposed adjacent in the length direction. An oblique end surface disposed parallel to the oblique end edge of the base portion 81 is provided at the end part on the opposite side on the side adjacent to the first magnetic wall body 33a in the second magnetic wall body 33b. That is, the oblique end surface of the second magnetic wall body 33b is formed as a flat surface disposed diagonally with respect to the length direction and the width direction in the plan view of the molded surface fastener 3. The width dimension of the second magnetic wall body 33b is as the same as the width dimension of the first magnetic wall body 33a.

The auxiliary magnetic wall portion 34 provided on the magnetic wall portion 30c of Embodiment 3 is formed to connect the outer wall surface of the second magnetic wall body 33b. The auxiliary magnetic wall portion 34 is disposed, regarding the length direction, to correspond to an area on which the main lateral wall portion 85 and a divided lateral wall body 86a, described later, of the auxiliary lateral wall portion 86.

The width dimension of the auxiliary magnetic wall portion 34 is smaller than the width dimension of the first magnetic wall body 33a and the second magnetic wall body 33b. Since the auxiliary magnetic wall portion 34 is provided, a distance between the auxiliary magnetic wall portion 34 and the outer wall portion 20 is smaller than a distance between the first magnetic wall body 33a and the second magnetic wall body 33b and the outer wall portion 20. The distance between the auxiliary magnetic wall portion 34 and the outer wall portion 20 is small to the degree that foam resin of the cushion body cannot pass through.

In Embodiment 3, height dimensions of the first magnetic wall body 33a, the second magnetic wall body 33b and the auxiliary magnetic wall portion 34 in the magnetic wall portion 30c from the upper surface of the base portion 81 are the same as each other, and are the same as the height dimension of the base portion 81 in the divided vertical wall portion 22 of the outer wall portion 20 from the upper surface of the base portion 81.

Magnetic particles are contained in the first magnetic wall body 33a, the second magnetic wall body 33b and the auxiliary magnetic wall portion 34 of the magnetic wall portion 30c. In this case, each upper end part of the first magnetic wall body 33a, the second magnetic wall body 33b and the auxiliary magnetic wall portion 34 is formed of the second synthetic resin only, and on the upper end part, magnetic particles are contained at a certain concentration within a range of 30 wt % or higher and 80 wt % or lower (50 wt %, for example).

The first magnetic wall body 33a, the second magnetic wall body 33b and the auxiliary magnetic wall portion 34 have a mixed area formed of the first synthetic resin and the second synthetic resin being mixed, and the mixed area is formed between each upper end part and the base portion 81. Further, the first magnetic wall body 33a, the second magnetic wall body 33b and the auxiliary magnetic wall portion 34 are formed such that a ratio of the second synthetic resin is gradually decreased while a ratio of the first synthetic resin is gradually increased from the upper end part toward the base portion 81.

Furthermore, on both right and left sides of each magnetic wall portion 30c in the molded surface fastener 3 in Embodiment 3, a right and left pair of grooved channel portions 40b grooved on the upper surface part of the base portion 81 are continuously formed along the length direction. In this case, in each magnetic wall portion 30c, as the grooved channel portions 40b, an inner groove channel portion 41b and the outer grooved channel portion 42b are provided as a set so as to interpose the magnetic wall portions 30c therebetween. In Embodiment 3, the outer grooved channel portion 42b is provided to have a smaller width dimension than the inner grooved channel portion 41b as shown in FIG. 15.

The front and rear pair of the main lateral wall portions 85 in Embodiment 3 stand on the upper surface of the base portion 81 integrally at the front end edge part and the rear end edge part of the base portion 81 so as to interpose the engaging area 14 of the surface fastener portion 80 from the front and rear direction. The front and rear main lateral wall portions 85 are disposed along the width direction in an area between the right and left second magnetic wall bodies 33b. The main lateral wall portion 85 is disposed to be apart in a size of the channel width dimension of an inner grooved channel portion 41b as described later with respect to the right and left second magnetic wall bodies 33b. In this case, a distance between the main lateral wall portion 85 and the right and left second magnetic wall bodies 33b is small to a degree that foam resin of the cushion body cannot pass through.

In the main lateral wall portion 85, two slits 85a cut off from the upper end of the main lateral wall portion 85 to the upper surface of the base portion 81. In this case, a dimension in the width direction of each slit 85a in the main lateral wall portion 85 is a small size to a degree that the foam resin of the cushion body cannot pass through. As the slit 85a is provided on the main lateral wall portion 85 as above, flexibility (flexibility in a direction to be bent in the upper and lower direction with respect to the width direction, in particular) of the surface fastener can be improved.

Each front and rear auxiliary lateral wall portion 86 in Embodiment 3 is disposed on the engaging area 14 side in parallel with the front and rear main lateral wall portion 85 in a separated state. In this case, a distance in the length direction between the main lateral wall portions 85 and a divided lateral wall body 86a described later of the auxiliary lateral wall portion 86 is smaller than a size of the forming pitch in the length direction of the engaging element 13. The right and left side edge parts of the main lateral wall portion 85 and the right and left side edge parts of the auxiliary lateral wall portions 86 are connected by a connecting-side wall portion 87 each other.

The auxiliary lateral wall portion 86 of Embodiment 3 is disposed along the width direction in an area between the right and left second magnetic wall bodies 33b. The auxiliary lateral wall portion 86 is disposed to be apart by a size of the channel width dimension of the inner grooved channel portion 41b with respect to the right and left second magnetic wall bodies 33b, as in the main lateral wall portion 85.

The auxiliary lateral wall portion 86 of Embodiment 3 has a plurality of divided lateral wall bodies 86a standing intermittently along the width direction and having a constant height dimension from the upper surface of the base portion 81, and a plurality of auxiliary engaging elements 86b disposed between each divided lateral wall body 86a. The divided lateral wall body 86a of the auxiliary lateral wall portion 86 stands on the upper surface of the base portion 81 and has a rectangular parallelepiped shape. The auxiliary engaging element 86b has a rising portion standing vertically from the upper surface of the base portion 81 and a cantilever shaped engaging head portion curved in a hook shape from the upper end part of the rising portion toward the engaging area 14 side (inside in the length direction in the surface fastener portion 80).

The connecting portion 90 connecting the adjacent surface fastener portions 80 has a base portion 81 in a thin plate shape and a protruded rib portion 89 protruded on the upper surface of the base portion 81. The base portion 81 and the protruded rib portion 89 of each connecting portion 90 are connected to the base portion 81 and the protruded rib portion 89 of the surface fastener portion 80 without having a step. In this case, the protruded rib portion 89 provided on the surface fastener portion 80 and the protruded rib portion 89 provided on the connecting portion 90 are integrally protruded on the upper surface of the base portion 81 so that a cross-section perpendicular to the length direction shows a rectangular shape.

The molded surface fastener 3 of Embodiment 3 as mentioned above is manufactured by molding a primary molded body in a straight shape and in a state that a plurality of surface fastener portions 80 are connected by the connecting portion 90 as above and a cut off portion 95 as shown in a dash line in FIG. 14 using the molding apparatus 60 having the die wheel 61 as shown in FIGS. 5 to 8, and thereafter, performing cutting processing of cutting off the cut off portion 95 shown in FIG. 14 with respect to the primary molded body using a cutting processing apparatus which is not shown in the drawings.

In this case, although the die wheel 61 has a plurality of first laminated plates 62a and four second laminated plates 62b as in the case of Embodiment 1 as above, a thickness of the first laminated plate 62a and the second laminated plate 62b are different from that in the case of Embodiment 1 as above, and a shape of the molding cavity formed on the first laminated plate 62a is different.

In Embodiment 3, a process for molding the primary molded body using the molding apparatus 60 is substantially as same as the process for molding the molded surface fastener 1 of the above-mentioned Embodiment 1. The cutting processing apparatus not shown in the drawings has a cutting die on which the primary molded body is placed, and a cutting punch disposed to be able to move up and down with respect to the cutting die and which can partially cut off the primary molded body, and is formed to be able to perform the cutting processing to the continuously conveyed primary molded body.

In the molded surface fastener 3 of Embodiment 3, right and left magnetic wall portions 30c containing magnetic particles are formed separately from the right and left outer wall portions 20, as in the molded surface fastener 1 of Embodiment 1 as above. Therefore, as a shape of the magnetic wall portion 30c, a simple shape to which the second synthetic resin can be easily poured can be adopted. Further, at least an upper end part of the right and left magnetic wall portions 30c is formed of the second synthetic resin only, and an upper surface of the magnetic wall portion 30c is formed to have small surface roughness by being flattened by the upper holding roller 67a of the pickup roller 67. Thus, the molded surface fastener 3 of Embodiment 3 can obtain the same effects as the molded surface fastener 1 of Embodiment 1 as above.

Further, the molded surface fastener 3 of Embodiment 3 is formed such that the plurality of surface fastener portion 80 are connected serially with the connecting portion 90 having flexibility. Therefore, the molded surface fastener 3 of Embodiment 3 can be easily curved in the upper and lower direction with respect to the length direction as well as curved in the right and left direction with respect to the length direction. Thus, the molded surface fastener 3 of Embodiment 3 is a curve-correspondable molded surface fastener 3 which can be integrated to a cushion body in an arc shape and the like which is curved in the width direction.

Therefore, when the molded surface fastener 3 of Embodiment 3 is integrated to a cushion body, the molded surface fastener 3 is placed on a surface fastener attaching surface of a molding die for foam molding of a cushion body in a curved state in the right and left direction and/or the upper and lower direction depending on a usage of the cushion body and a design of a product, and further, is attracted and held with a magnet provided on the fastener holding portion. At this time, each surface fastener portion 80 of the molded surface fastener 3 is held in a state that each upper surface of the right and left outer wall portions 20, the front and rear main lateral wall portions 85, the front and rear auxiliary lateral wall portions 86 and the right and left magnetic wall portions 30c of the surface fastener portion 80 is adhered to the fastener attaching surface of the molding die.

In Embodiment 3 in particular, a narrow width magnet is attached to the fastener holding portion of the molding die, and the right and left magnetic wall portions 30c are arranged on an inside of the right and left outer wall portions 20, thereby a distance between the right and left magnetic wall portions 30c is small. Therefore, the right and left magnetic wall portions 30c are attracted simultaneously with the narrow width magnet, and the molded surface fastener 3 can be stably fixed to the fastener holding portion (fastener attaching surface) of the molding die without having a position displacement.

Thereafter, foam resin is injected into the molding die to perform foam molding of the cushion body. At this time, the right and left outer wall portions 20, the front and rear main lateral wall portions 85, the front and rear auxiliary lateral wall portions 86, and the right and left magnetic wall portions 30c of each surface fastener portion 80 are adhered to the fastener attaching surface of the molding die as above. Therefore, the foam resin is not intruded into the engaging area 14 of the surface fastener portion 80 over them, and the engaging element 13 can be stably prevented from being buried in the foam resin of the cushion body.

When the foam resin is foam-cured and the foam molding is completed, the cushion body in which the molded surface fastener 3 is integrated at a required position in a curved state is manufactured. In thus obtained cushion body, the foam body is not intruded into the engaging area 14 of the molded surface fastener 3, and the engaging element 13 and the auxiliary engaging element 86b are exposed, thereby an engaging force that the engaging element 13 and the auxiliary engaging element 86b inherently have can be stably secured.

REFERENCE SIGNS LIST 1, 1a Molded surface fastener
2, 3 Molded surface fastener
11 Base portion
13 Engaging element
13a Rising portion
13b Engaging head portion
14 Engaging area
15 Lateral wall portion
15a First lateral wall portion
15b Second lateral wall portion
15c Connected lateral wall portion
17 Fin piece portion
20 Outer wall portion
21 Vertical wall row
21a First vertical wall row
21b Second vertical wall row
22 Divided vertical wall row
23 Connected wall portion
24 Reinforcement portion
30, 30a Magnetic wall portion
30b, 30c Magnetic wall portion
31, 31a Magnetic wall body
31b Magnetic wall body
32 Auxiliary magnetic wall portion
33a First magnetic wall body
33b Second magnetic wall body
34 Auxiliary magnetic wall portion
35 Mixed area
37 Boundary between part of second synthetic resin only and mixed area
38 Center line in length direction of magnetic wall body
40, 40a Grooved channel portion
40b Grooved channel portion
41, 41a Inner grooved channel portion
41b Inner grooved channel portion
42, 42a Outer grooved channel portion
42b Outer grooved channel portion
50 Outer wall portion
52 Divided vertical wall portion
52a Vertical wall main body portion
52b Auxiliary vertical wall portion
54 Reinforcement portion
60 Molding apparatus
61 Die wheel
62 Laminated plate
62a First laminated plate
62b Second laminated plate
63 Rotating shaft portion
66 Extrusion nozzle
66a First flow path
66b Second flow path
66c Discharging surface
66d First discharging outlet
66e Second discharging outlet
67 Pickup roller
67a Upper holding roller
67b Lower holding roller
70 Molding die
71 Fastener holding portion
72 Fastener attaching surface (cavity surface)
73 Magnet
75 Cushion body (foam body)
80 Surface fastener portion
81 Base portion
85 Main lateral wall portion
85a Slit
86 Auxiliary lateral wall portion
86a Divided lateral wall body
86b Auxiliary engaging element
87 Connecting-side wall portion
89 Protruded rib portion
90 Connecting portion
95 Cut off portion
D1 Distance between inner wall surfaces of right and left magnetic wall portions
D2 Distance between outer wall surfaces of right and left magnetic wall portions
MD Machine direction
W Width dimension of magnet

The invention claimed is:

1. A molded surface fastener comprising a base portion in a thin-plate shape, right and left outer wall portions standing on an upper surface of the base portion along a length direction, and a plurality of engaging elements disposed between the right and left outer wall portions; and formed by melting to integrate first synthetic resin and second synthetic resin containing magnetic particles at a certain ratio;

wherein at least each upper end part of the right and left outer wall portions is formed of the first synthetic resin only, right and left magnetic wall portions in which at least each upper end part is formed of the second synthetic resin only stand on the upper surface of the base portion, each of the right and left magnetic wall portions is disposed along the length direction at a position between the outer wall portion and the engaging elements in a width direction, and the base portion has grooved channel portions grooved on the upper surface of the base portion and disposed between each of the outer wall portions and each of the magnetic wall portions, and between the engaging elements and each of the magnetic wall portions.

2. The molded surface fastener according to claim 1, wherein the magnetic wall portion has a mixed area formed of the first synthetic resin and the second synthetic resin being mixed.

3. The molded surface fastener according to claim 1, wherein the grooved channel portions have a constant channel depth from the upper surface of the base portion and are grooved continuously along the length direction.

4. The molded surface fastener according to claim 1, wherein the grooved channel portions have an inner grooved channel portion disposed on an engaging element side of the magnetic wall portion, an outer grooved channel portion disposed on an outer wall portion side of the magnetic wall portion, and
 a width dimension of the inner grooved channel portion and a width dimension of the outer grooved channel portion have different sizes from each other.

5. The molded surface fastener according to claim 1, wherein a height dimension of the magnetic wall portion is same as a height dimension of the outer wall portion.

6. The molded surface fastener according to claim 1, wherein the magnetic wall portion has a plurality of magnetic wall bodies disposed intermittently at predetermined pitches along the length direction.

7. The molded surface fastener according to claim 6, wherein each of the magnetic wall bodies has a mixed area formed of the first synthetic resin and the second synthetic resin being mixed, and
 the mixed area is disposed disproportionately on one side of the length direction of the molded surface fastener.

8. The molded surface fastener according to claim 1, wherein a dimension of the magnetic wall portion in the width direction is a size as same as to six times an average particle size of the magnetic particles.

9. The molded surface fastener according to claim 1, wherein, in a state of being attached to a molding die of a cushion body to which the molded surface fastener is to be integrated, at least a part of an upper surface of the left magnetic wall portion and at least a part of an upper surface of the right magnetic wall portion are formed to be able to contact a magnet mounted on the molding die.

10. A manufacturing method of a molded surface fastener having a base portion in a thin plate shape, right and left outer wall portions standing on an upper surface of the base portion along a length direction, and a plurality of engaging elements disposed between the right and left outer wall portions, using a molding apparatus having a die wheel rotating in one direction, and an extrusion nozzle discharging first synthetic resin and second synthetic resin which contains magnetic particles at a certain ratio in a molten state toward the die wheel,
 wherein the method including:
  discharging the first synthetic resin from a first discharging outlet of the extrusion nozzle and discharging the second synthetic resin from a second discharging outlet of the extrusion nozzle toward the die wheel,
  forming at least each upper end part of the right and left outer wall portions with the first synthetic resin only,
  molding right and left magnetic wall portions in which at least each upper end part is formed of the second synthetic resin only and each of which is disposed along the length direction at a position in a width direction between one of the outer wall portions and the engaging elements on the upper surface of the base portion, and
 molding grooved channel portions on the upper surface of the base portion, and disposed between each of the outer wall portions and each of the magnetic wall portions, and between the engaging elements and each of the magnetic wall portions.

11. The manufacturing method of the molded surface fastener according to claim 10, wherein the method including:
 forming the die wheel by layering a plurality of ring-shaped laminated plates in a rotating shaft direction,
 using a plurality of first laminated plates having a certain radius and a plurality of second laminated plates having a certain radius larger than the first laminated plates,
 using two of the second laminated plates as a pair for each of the second discharging outlets, and arranging the pair of the second laminated plates to be disposed so that the second discharging outlets is disposed between the pair of the second laminated plates, and
 molding the grooved channel portions by a difference of the radius in the first laminated plates and in the second laminated plates in the die wheel.

\* \* \* \* \*

UNITED STATES PATENT AND TRADEMARK OFFICE
CERTIFICATE OF CORRECTION

| | | |
|---|---|---|
| PATENT NO. | : 11,528,966 B2 | Page 1 of 1 |
| APPLICATION NO. | : 16/963744 | |
| DATED | : December 20, 2022 | |
| INVENTOR(S) | : Zhiyu Ren et al. | |

It is certified that error appears in the above-identified patent and that said Letters Patent is hereby corrected as shown below:

In the Specification

In Column 11, Line 48, before "line" insert -- III-III --.

In Column 12, Line 34, before "line" insert -- III-III --.

Signed and Sealed this
Fourteenth Day of February, 2023

Katherine Kelly Vidal
*Director of the United States Patent and Trademark Office*